(12) United States Patent
Arai

(10) Patent No.: US 7,280,453 B2
(45) Date of Patent: Oct. 9, 2007

(54) OPTICAL HEAD AND READ/WRITE DRIVE INCLUDING THE OPTICAL HEAD

(75) Inventor: Akihiro Arai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 689 days.

(21) Appl. No.: 10/834,710

(22) Filed: Apr. 28, 2004

(65) Prior Publication Data

US 2004/0213116 A1    Oct. 28, 2004

(30) Foreign Application Priority Data

Apr. 28, 2003    (JP) .............................. 2003-124047

(51) Int. Cl.
*G11B 7/125*    (2006.01)
(52) U.S. Cl. ...................... 369/53.2; 369/94
(58) Field of Classification Search ............... 369/53.2, 369/94
See application file for complete search history.

(56) References Cited

U.S. PATENT DOCUMENTS 5,862,118 A * 1/1999 Takahashi ................ 369/44.23
6,438,088 B1 * 8/2002 Sugiyama et al. ...... 369/112.01
7,054,240 B2 * 5/2006 Song et al. ............... 369/44.29
7,130,250 B2 * 10/2006 Fujiune et al. ........... 369/44.27

FOREIGN PATENT DOCUMENTS

JP    09-259456 A    10/1997

* cited by examiner

*Primary Examiner*—Gautam R. Patel
(74) *Attorney, Agent, or Firm*—Akin Gump Strauss Hauer & Feld LLP

(57) ABSTRACT

A drive reads and/or writes data from/on an optical data storage medium, including first and second data storage layers stacked in this order toward the depth thereof, by radiating light through the surface. The drive includes a light source, a lens, a light detector, and a layer sensor. The light source emits the light. The lens produces a focal spot. The light detector includes at least one photodetector for receiving the light and generating a light quantity signal. The photodetector is used as a layer-sensing photodetector not receiving the light from the second data storage layer when the focal spot is located on the first data storage layer and receiving the light from the first data storage layer when the focal spot is located on the second data storage layer. The layer sensor determines, by the light quantity signal, where the focal spot is now located.

11 Claims, 10 Drawing Sheets

OPTICAL HEAD AND READ/WRITE DRIVE INCLUDING THE OPTICAL HEAD

BACKGROUND OF THE INVENTION

1. Field of the Invention

The present invention relates to an optical head for optically reading and/or writing data from/on an optical data storage medium (such as an optical disc) including multiple data storage layers and also relates to a read/write drive including such an optical head.

2. Description of the Related Art

An optical disc is known as a typical optical data storage medium from/on which data is optically read/written. An optical disc drive including an optical head is used to read and/or write data from/on an optical disc. Specifically, in reading and writing data from/on a given optical disc, the optical disc drive gets the optical disc irradiated with a certain quantity of light by the optical head and then detects the light that has been reflected from the optical disc. In this case, the optical disc drive controls a position of a focal spot of the light beam not only perpendicularly to the optical disc (i.e., a focus control) but also in the radial direction of the optical disc (i.e., a tracking control). The focus control is needed to focus the light beam right on a data storage layer, while the tracking control is needed to make the spot of the light beam always follow the target track on the data storage layer.

Recently, a variety of optical discs on the market often include a number of data storage layers to increase the maximum storage capacity. To read and/or write data from/on such an optical disc, a specially designed optical head and an optical disc drive including such an optical head are reported in various documents. If a given optical disc includes a number of data storage layers in this manner, the optical disc drive has to determine whether or not the data storage layer on which the focal spot of the light beam is currently located is the target layer to read data from and/or write data on.

For example, the optical disc drive disclosed in Japanese Laid-Open Publication No. 9-259456 carries out a tracking control operation on an optical disc with two data storage layers by a three-beam technique that uses one main beam and two sub-beams on the right- and left-hand sides of the main beam. The optical disc drive also senses, by using these sub-beams, on which data storage layer the focal spot is currently located. Hereinafter, that focus finding operation performed by this optical disc drive will be described.

First, referring to FIG. 14A, illustrated is a state in which the focal spot of light 111 is located on the deeper one (L0) of the two data storage layers L0 and L1 of an optical disc 105. The light 111, which has been emitted from a light source included in the optical head (not shown) of an optical disc drive, passes through an objective lens 110 to be incident onto the optical disc 105. In the example illustrated in FIG. 14A, the two data storage layers are respectively identified by the reference numerals L1 and L0 in the order in which the light 111 passes and will be simply referred to herein as the "layer L1" and "layer L0", respectively. After having been incident onto the layer L1, the light 111 is then reflected by the layer L0 and follows the same optical path in the opposite direction so as to be incident onto the objective lens 110 again and then detected at the light detector of the optical head.

FIG. 14B shows the light detector 112 of the optical head and the light that has been reflected from the layer L0 and then received at the light detector 112. This optical disc drive uses the three-beam technique. Accordingly, at this point in time, the reflected light 111 has already been split into a main beam and two sub-beams.

The light detector 112 includes a quadrant photodetector 112a for receiving the main beam, two photodetectors 112b and 112c for receiving sub-beams to detect a tracking error signal, and another two photodetectors 112d and 112e for receiving sub-beams to find on which layer the focal spot is now located. In the example illustrated in FIG. 14A, the light 111 is focused on the layer L0. Accordingly, the light that has been reflected from the layer L0 (i.e., a layer L0 main beam and two layer L0 sub-beams) is incident onto the photodetectors 112a, 112b and 112c to form beam spots that do not exceed the outer edges of the photodetectors 112a, 112b and 112c. On the other hand, the light that has been reflected from the layer L1 (i.e., a layer L1 main beam and two layer L1 sub-beams) have expanded beam shapes, and the gap between the two sub-beams broadens. In FIG. 14B, the beam shapes of the layer L1 main and sub-beams received are indicated by the dashed circles. As shown in FIG. 14B, the layer L1 main and sub-beams are all greater in cross-sectional area than the photodetectors 112a, 112b and 112c. Looking at the other two photodetectors 112d and 112e, it can be seen that the light that has been reflected from the layer L1 is received in the greater quantity by the photodetector 112e than by the photodetector 112d.

On the other hand, FIG. 15A illustrates a state in which the focal spot of the light 111 that has passed through the objective lens 110 is located on the shallower one (L1) of the two data storage layers L0 and L1 of the optical disc 105. In this case, the light that has been reflected from the optical disc 105 is received as shown in FIG. 15B. FIG. 15B shows the light detector 112 of the optical head and the light that has been reflected from the layer L1 and then received at the light detector 112. The light detector 112 shown in FIG. 15B has the same arrangement as the counterpart shown in FIG. 14B. In the example illustrated in FIG. 15A, the light 111 is focused on the layer L1. Accordingly, the light that has been reflected from the layer L1 (i.e., a layer L1 main beam and two layer L1 sub-beams) is incident onto the photodetectors 112a, 112b and 112c to form beam spots that do not exceed the outer edges of the photodetectors 112a, 112b and 112c. On the other hand, the light that has been reflected from the layer L0 (i.e., a layer L0 main beam and two layer L0 sub-beams) has expanded beam shapes, and the gap between the two sub-beams narrows. In FIG. 15B, the beam shapes of the layer L1 main and sub-beams received are indicated by the dashed circles. As shown in FIG. 15B, the layer L0 main and sub-beams are all greater in cross-sectional area than the photodetectors 112a, 112b and 112c. Looking at the other two photodetectors 112d and 112e, it can be seen that the light that has been reflected from the layer L0 is received in the greater quantity by the photodetector 112d than by the photodetector 112e.

Accordingly, by comparing the quantities of light received by the photodetectors 112d and 112e with each other, the optical disc drive can determine whether the focal spot is located on the layer L0 or on the layer L1. More specifically, if the quantity of light received by the photodetector 112d is greater than that of light received by the photodetector 112e, then it can be seen that the focal spot is currently located on the layer L1. On the other hand, if the quantity of light received by the photodetector 112e is greater than that of light received by the photodetector 112d, then it can be seen that the focal spot is currently located on the layer L0.

However, the conventional layer sensing method adopts the three-beam method that uses sub-beams, and therefore, is never applicable for use in any optical head that adopts a single-beam method using no sub-beams or a read/write drive including such an optical head. This is not advantageous because the three-beam method is much more complicated in required arrangement and processing than the single-beam method. Thus, there is a lot of demand for the technique of locating the focal spot accurately by the single-beam method that uses a simpler arrangement.

SUMMARY OF THE INVENTION

In order to overcome the problems described above, preferred embodiments of the present invention provide an optical head, which can accurately determine, by the single-beam method, on or around which of a number of data storage layers the focal spot of light is currently located, and also provide a read/write drive including such an optical head.

A drive according to a preferred embodiment of the present invention is preferably designed so as to read and/or write data from/on an optical data storage medium loaded, including a first data storage layer and a second data storage layer that are stacked in this order from the surface thereof toward the depth thereof, by radiating light through the surface toward the depth of the optical data storage medium. The drive preferably includes a light source, a lens, a light detector, and a layer sensor. The light source preferably emits the light. The lens preferably produces a focal spot by converging the light that has been emitted from the light source. The light detector preferably includes at least one photodetector for receiving the light and generating a light quantity signal representing quantity of the light received. The at least one photodetector is preferably used as a layer-sensing photodetector that is designed so as not to receive the light reflected from the second data storage layer when the focal spot is located on the first data storage layer and so as to receive the light reflected from the first data storage layer when the focal spot is located on the second data storage layer. The layer sensor preferably determines, in accordance with the light quantity signal representing the quantity of the light received at the layer-sensing photodetector, where the focal spot is now located, on the first data storage layer, on the second data storage layer, or in the vicinity thereof.

In one preferred embodiment of the present invention, the drive preferably further includes a diffraction element including a diffracting region for deflecting the receive light. When the focal spot is located on the second data storage layer, the diffracting region preferably deflects the light, reflected from the first data storage layer, toward the layer-sensing photodetector.

In this particular preferred embodiment, the drive preferably further includes a signal generator for generating a focus error signal. The diffraction element preferably includes a transmitting region for transmitting the light reflected from the first data storage layer if the focal spot is located on the first data storage layer. The light detector preferably further includes a processing photodetector, which includes a plurality of divided areas to receive the light transmitted through the transmitting region. The signal generator preferably generates the focus error signal in accordance with the light quantity signals representing the quantities of the light received at the divided areas. The layer sensor preferably locates the focal spot in accordance with the focus error signal.

In another preferred embodiment, the drive preferably further includes a diffraction element including a diffracting region for deflecting the receive light. The light detector is preferably arranged between a point toward which the light reflected from the second data storage layer converges when the focal spot is located on the first data storage layer and a point toward which the light reflected from the first data storage layer converges when the focal spot is located on the second data storage layer. When the focal spot is located on the second data storage layer, the diffracting region deflects a portion of the light reflected from the first data storage layer such that the deflected light enters the layer-sensing photodetector. When the focal spot is located on the first data storage layer, the diffracting region preferably deflects a portion of the light reflected from the second data storage layer such that the deflected light enters another region of the light detector, not the layer-sensing photodetector. In accordance with the light quantity signal, the layer sensor preferably locates the first and second data storage layers with respect to the focal spot.

In still another preferred embodiment, the optical data storage medium may further include a third data storage layer, which is located deeper from the surface of the optical data storage medium than the second data storage layer is. The layer-sensing photodetector may include a first photosensitive element, which is designed so as to receive the light reflected from the first data storage layer when the focal spot is located on the third data storage layer, and a second photosensitive element, which is designed so as to receive the light reflected from the second data storage layer when the focal spot is located on the third data storage layer. The layer sensor may determine, in accordance with the light quantity signals supplied from the first and second photosensitive elements, whether or not the focal spot is located on the third data storage layer of the optical data storage medium loaded.

In this particular preferred embodiment, the drive preferably further includes a diffraction element including a diffracting region for deflecting the receive light. When the focal spot is located on the third data storage layer, the diffracting region preferably deflects the light, reflected from the first data storage layer, toward the first photosensitive element and the light, reflected from the second data storage layer, toward the second photosensitive element, respectively. When the focal spot is located on the second data storage layer, the diffracting region preferably deflects the light, reflected from the first data storage layer, toward the first photosensitive element but does not deflect the light, reflected from the second or third data storage layer, toward the second photosensitive element. The layer sensor preferably determines, in accordance with the light quantity signals supplied from the first and second photosensitive elements, on what data storage layer of the optical data storage medium the focal spot is now located.

More specifically, the drive preferably further includes a signal generator for generating a focus error signal. The diffraction element preferably includes a transmitting region for transmitting the light reflected from the first data storage layer if the focal spot is located on the first data storage layer, the light reflected from the second data storage layer if the focal spot is located on the second data storage layer, and the light reflected from the third data storage layer if the focal spot is located on the third data storage layer, respectively. The light detector preferably further includes a processing photodetector, which includes a plurality of divided areas to receive the light transmitted through the transmitting region. The signal generator preferably generates the focus error signal in accordance with the light quantity signals representing the quantities of the light received at the divided areas. The layer sensor preferably locates the focal spot in accordance with the focus error signal.

In yet another preferred embodiment, the drive preferably further includes a read processor for reading the data from the optical data storage medium in accordance with the light quantity signal supplied from the processing photodetector.

In yet another preferred embodiment, the optical data storage medium preferably includes a number N (where N is an integer that is equal to or greater than four) of data storage layers. The first data storage layer is preferably one of the (N−1) data storage layers except the deepest layer as measured from the surface toward the depth, while the second data storage layer is preferably deeper than the first data storage layer as measured from the surface toward the depth.

An optical head according to a preferred embodiment of the present invention is preferably designed so as to read and/or write data from/on an optical data storage medium loaded, including a first data storage layer and a second data storage layer that are stacked in this order from the surface thereof toward the depth thereof, by radiating light through the surface toward the depth of the optical data storage medium. The optical head preferably includes a light source, a lens, a light detector and a layer sensor. The light source preferably emits the light. The lens preferably produces a focal spot by converging the light that has been emitted from the light source. The light detector preferably includes at least one photodetector for receiving the light and generating a light quantity signal representing quantity of the light received. The at least one photodetector is preferably used as a layer-sensing photodetector that is designed so as not to receive the light reflected from the second data storage layer when the focal spot is located on the first data storage layer and so as to receive the light reflected from the first data storage layer when the focal spot is located on the second data storage layer. The layer sensor preferably determines, in accordance with the light quantity signal supplied from the layer-sensing photodetector, on which of the first and second data storage layers of the optical data storage medium the focal spot is now located.

A controller according to a preferred embodiment of the present invention is preferably built in an apparatus. The apparatus is preferably used to read and/or write data from/on an optical data storage medium loaded, including a first data storage layer and a second data storage layer that are stacked in this order from the surface thereof toward the depth thereof, by radiating light through the surface toward the depth of the optical data storage medium. The apparatus preferably includes a light source, a lens, and a light detector. The light source preferably emits the light. The lens preferably produces a focal spot by converging the light that has been emitted from the light source. The light detector preferably includes at least one photodetector for receiving the light and generating a light quantity signal representing quantity of the light received. The at least one photodetector is preferably used as a layer-sensing photodetector that is designed so as not to receive the light reflected from the second data storage layer when the focal spot is located on the first data storage layer and so as to receive the light reflected from the first data storage layer when the focal spot is located on the second data storage layer. The controller preferably receives the light quantity signal from the layer-sensing photodetector and preferably determines, by the level of the light quantity signal, where the focal spot is now located, on the first data storage layer, on the second data storage layer, or in the vicinity thereof.

In an optical head according to a preferred embodiment of the present invention, the light detector thereof preferably includes a layer-sensing photodetector that is designed so as not to receive the light reflected from the second data storage layer when the focal spot is located on the first data storage layer and so as to receive the light reflected from the first data storage layer when the focal spot is located on the second data storage layer. The optical head preferably further includes a layer sensor, which is implemented as a control circuit, for example, and preferably determines, in accordance with the light quantity signal representing the quantity of the light received at the layer-sensing photodetector, where the focal spot is now located, on the first data storage layer, on the second data storage layer, or in the vicinity thereof. This processing can be carried out just by obtaining the light quantity signal representing the quantity of the light reflected and received at the layer-sensing photodetector. Thus, the layer on which the focal spot is currently located can be sensed very quickly. Also, this optical head does not have to adopt the three-beam method but may use the single-beam method instead. Accordingly, the optical head can have a simpler configuration.

Furthermore, even when the optical head according to the preferred embodiment of the present invention is implemented in an apparatus, the layer on which the focal spot is currently located can also be sensed very quickly just by obtaining the light quantity signal representing the quantity of the light reflected and received at the layer-sensing photodetector. Accordingly, if the focal spot is located before a focus servo control is started, then the time it takes to access the data after the apparatus has been turned ON can be shortened. Also, if the focal spot is located before data starts being read from, or written on, another layer, then the target layers can be switched quickly and reliably.

Other features, elements, processes, steps, characteristics and advantages of the present invention will become more apparent from the following detailed description of preferred embodiments of the present invention with reference to the attached drawings.

Figure 5:
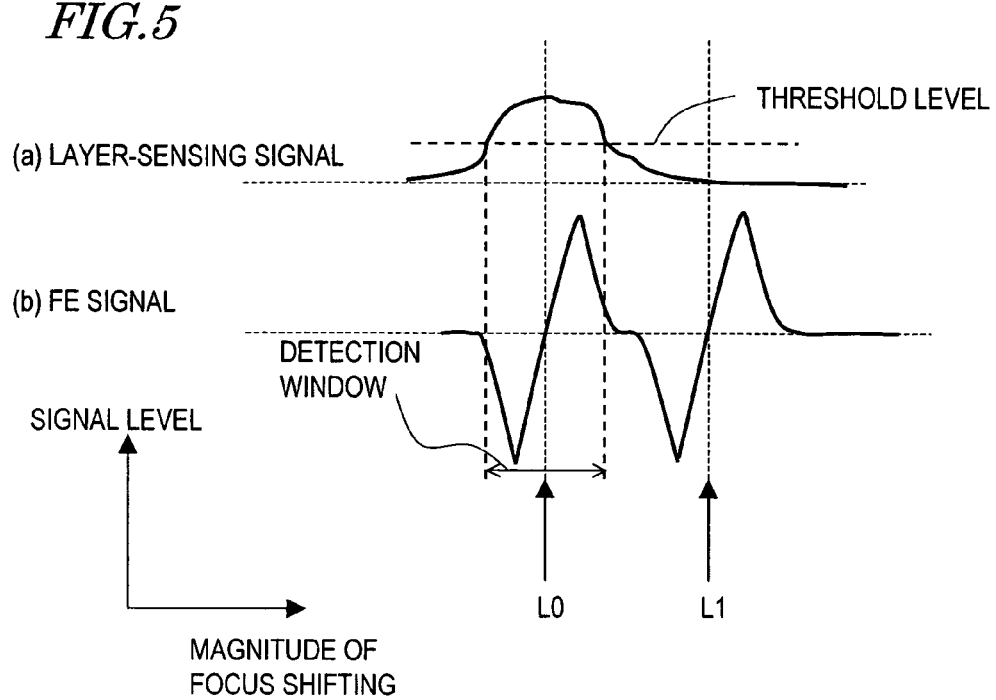

Portion (a) of FIG. 5 shows the waveform of a layer-sensing signal, and portion (b) of FIG. 5 shows the waveform of an FE signal.

Figure 6:
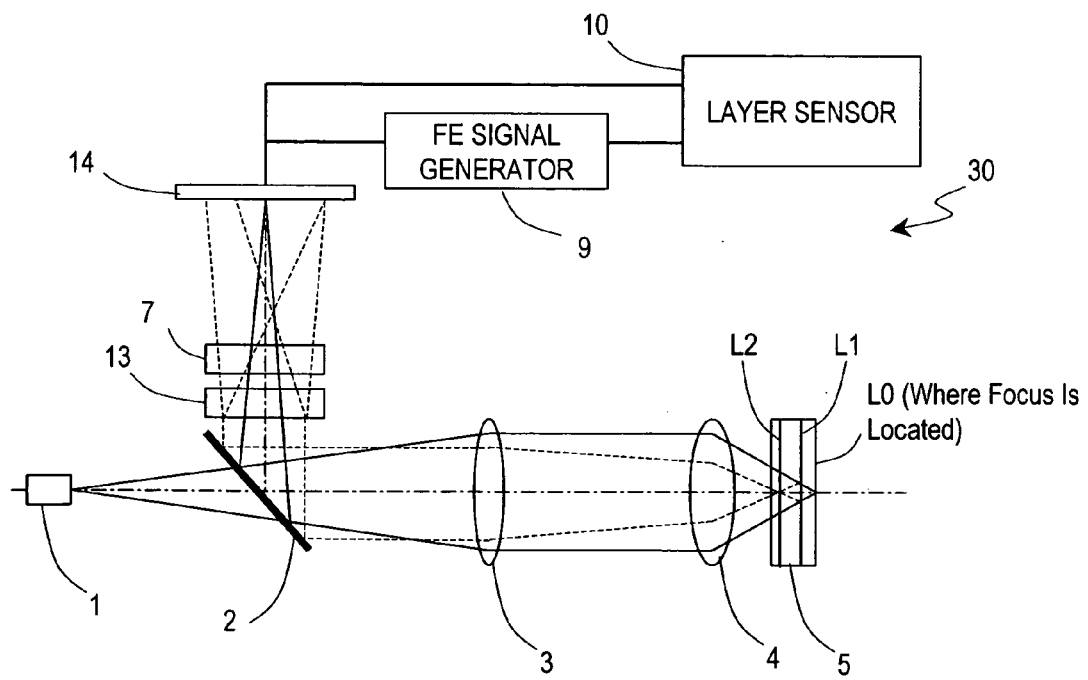

FIG. 6 shows an arrangement for an optical head 30 according to a second specific preferred embodiment of the present invention.

Figure 7:
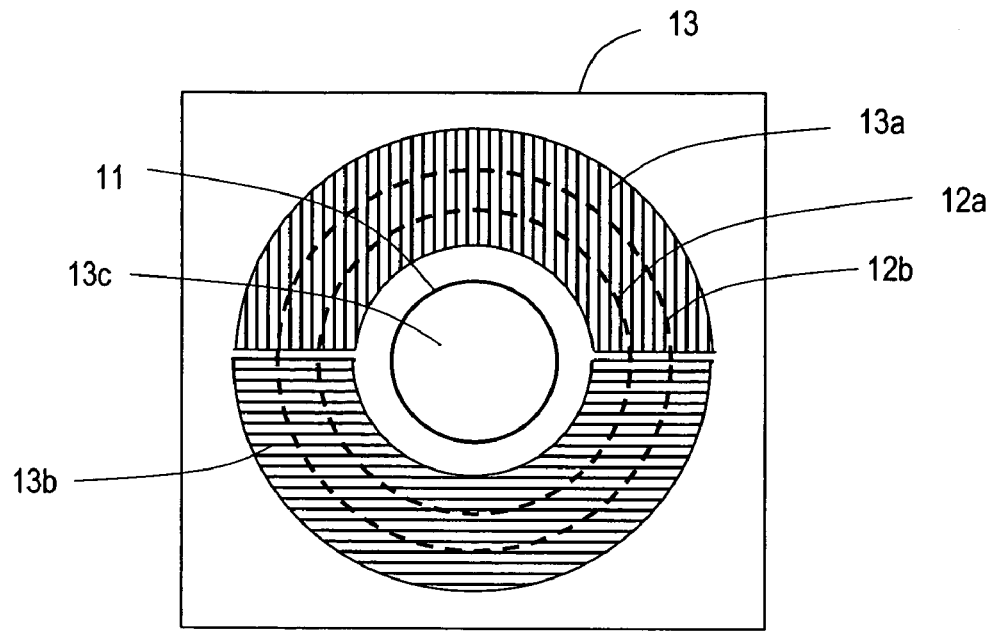

FIG. 7 shows a relationship between the diffraction pattern of the diffraction element 13 and the beam cross section of the incoming light.

Figure 8:
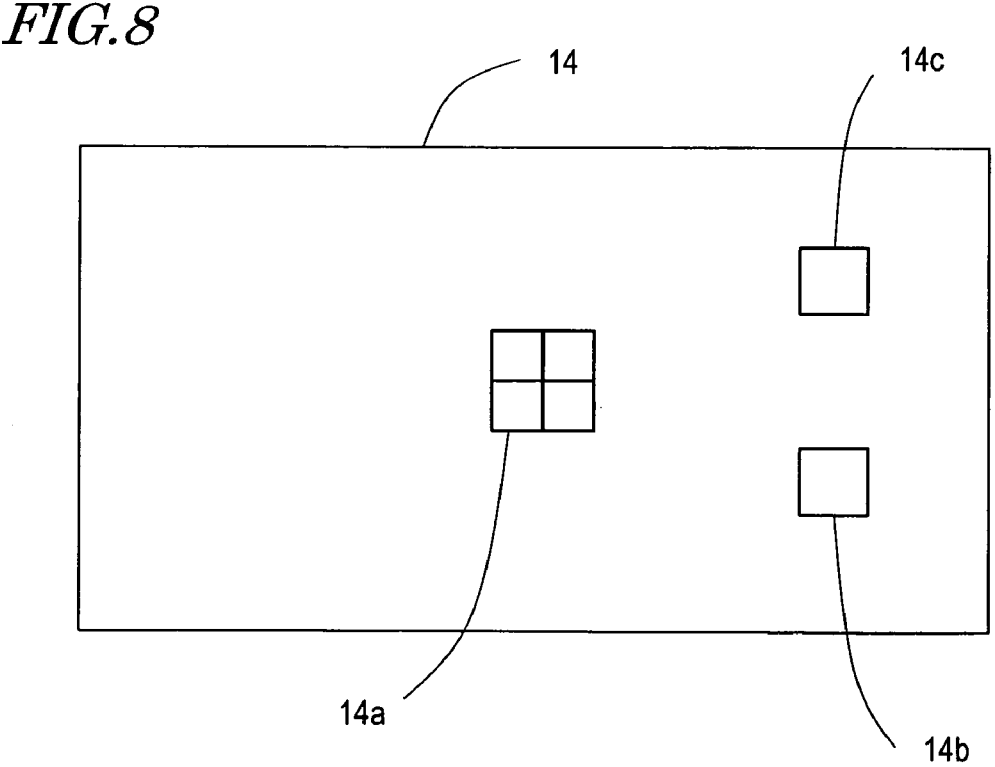

FIG. 8 shows a detailed configuration for the light detector 14.

Figure 9:
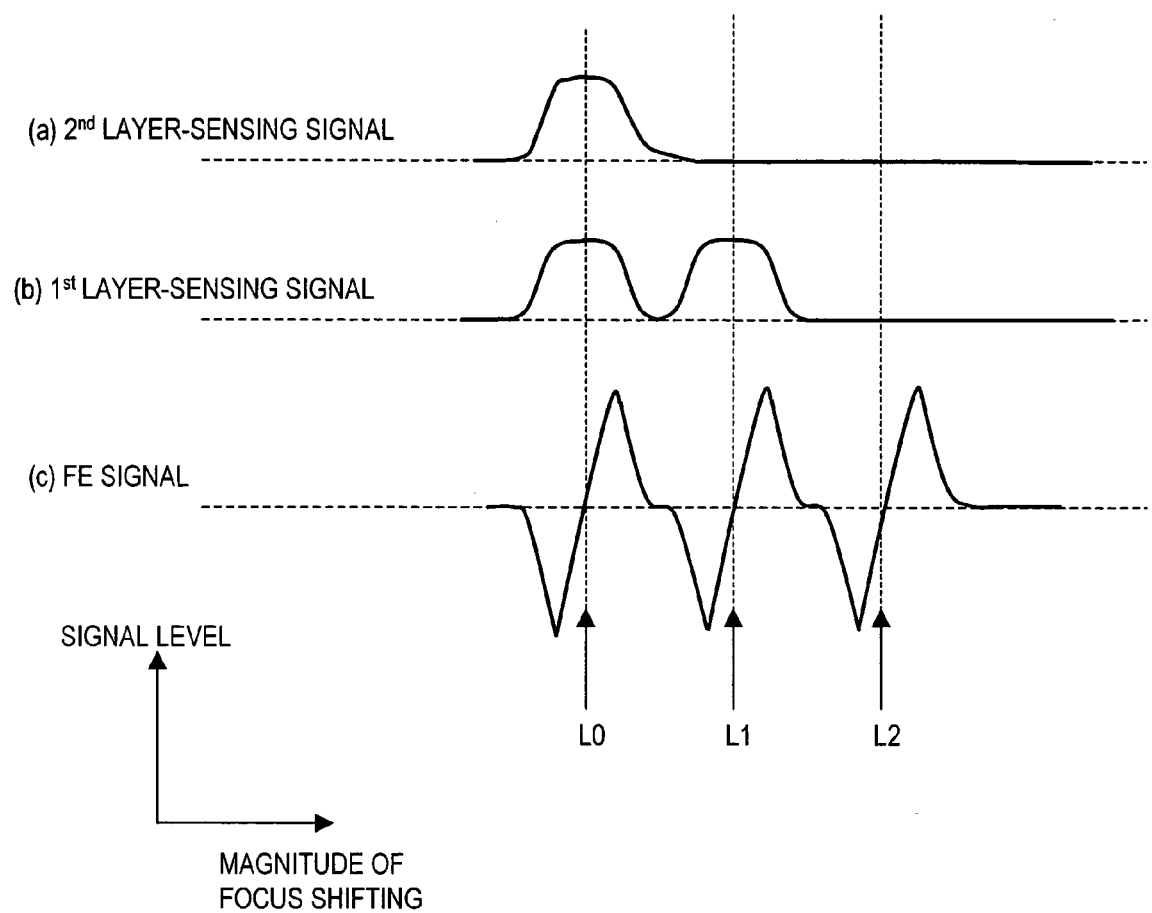

Portions (a) and (b) of FIG. 9 show the waveforms of two layer-sensing signals, and portion (c) of FIG. 9 shows the waveform of an FE signal.

Figure 10:
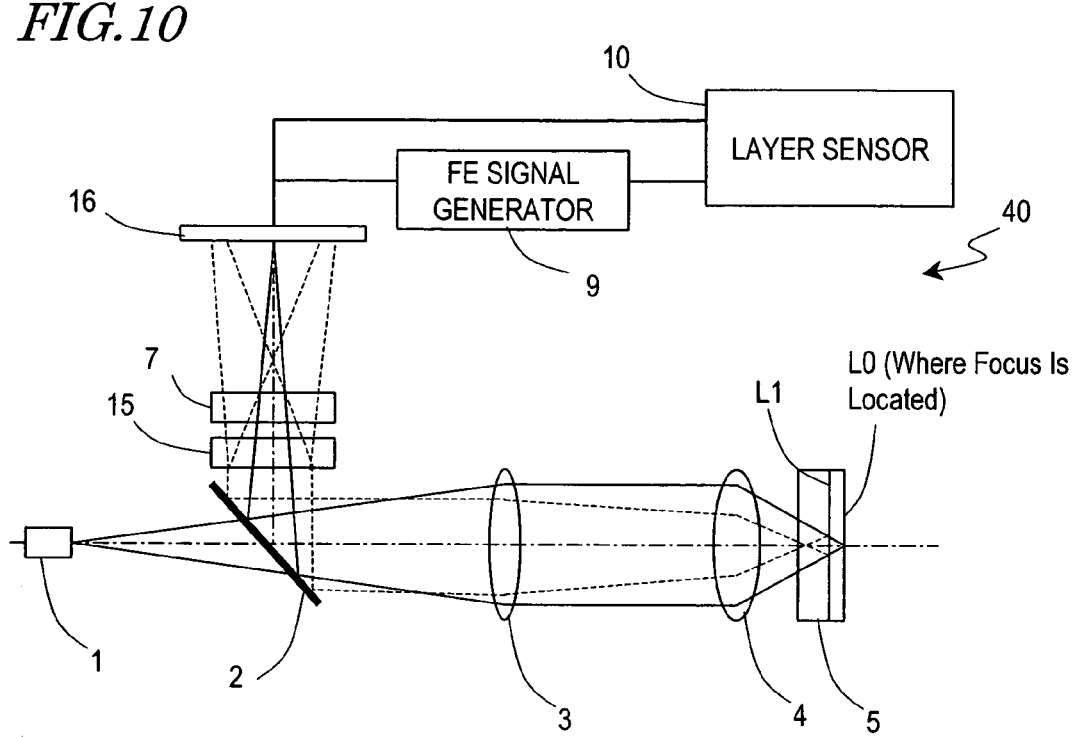

FIG. 10 shows an arrangement for an optical head 40 according to a third specific preferred embodiment of the present invention.

Figure 11:
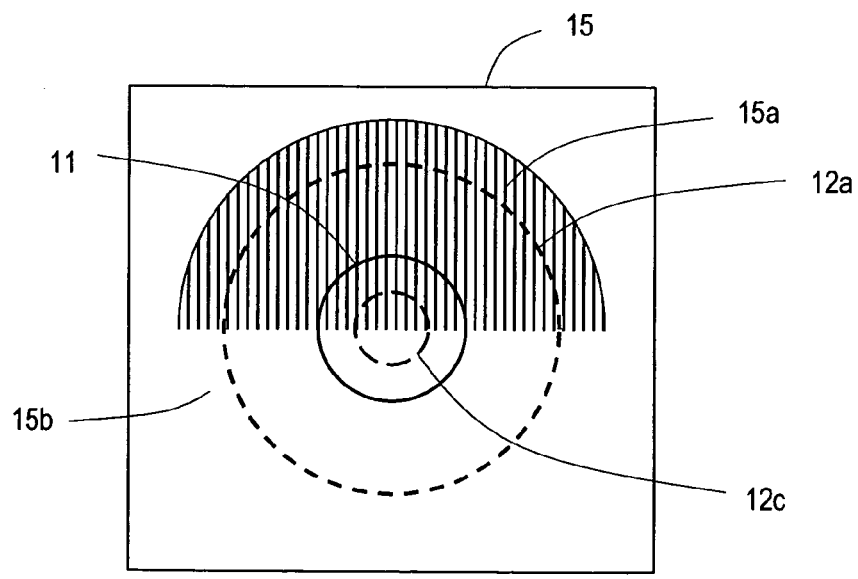

FIG. 11 shows a relationship between the diffraction pattern of the diffraction element 15 and the beam cross section of the incoming light.

Figure 12:
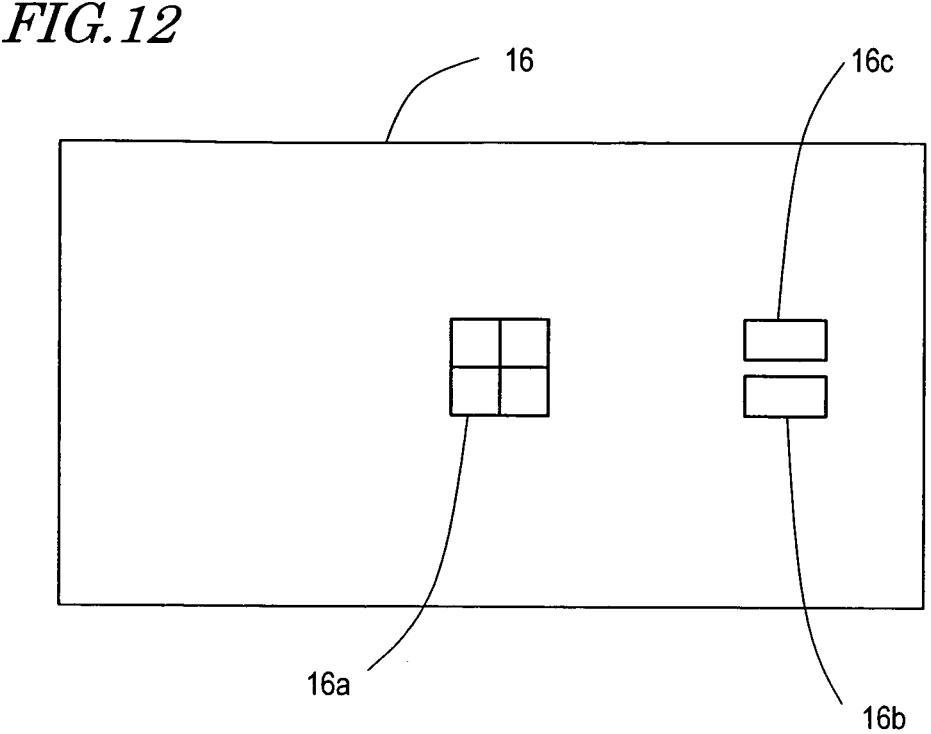

FIG. 12 shows a detailed configuration for the light detector 16.

Figure 13A:
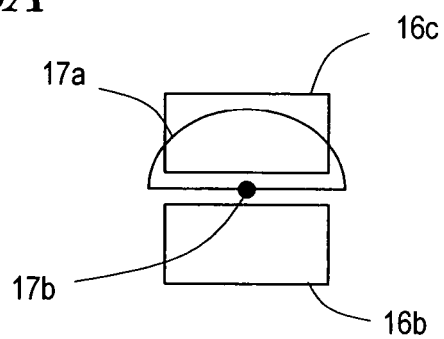

FIG. 13A shows what beam shape the received light has if there is another data storage layer shallower than the data storage layer on which the focal spot is currently located.

Figure 13B:
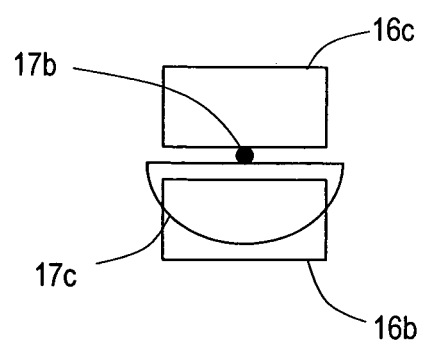

FIG. 13B shows what beam shape the received light has if there is another data storage layer deeper than the data storage layer on which the focal spot is currently located.

Figure 14A:
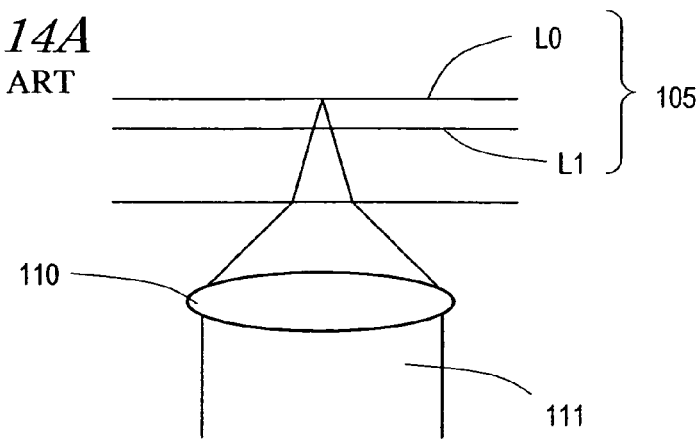

FIG. 14A illustrates a state in which the focal spot of light 111 is located on a data storage layer L0.

Figure 14B:
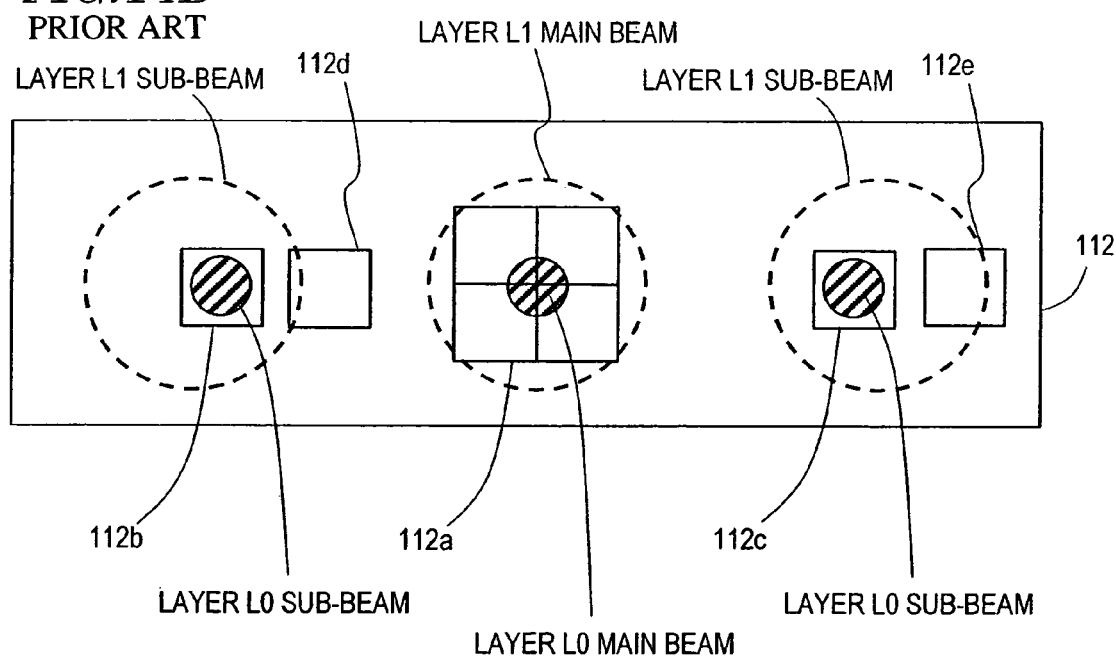

FIG. 14B shows the light detector 112 of the optical head and the light that has been reflected from the layer L0 and then received at the light detector 112.

Figure 15A:
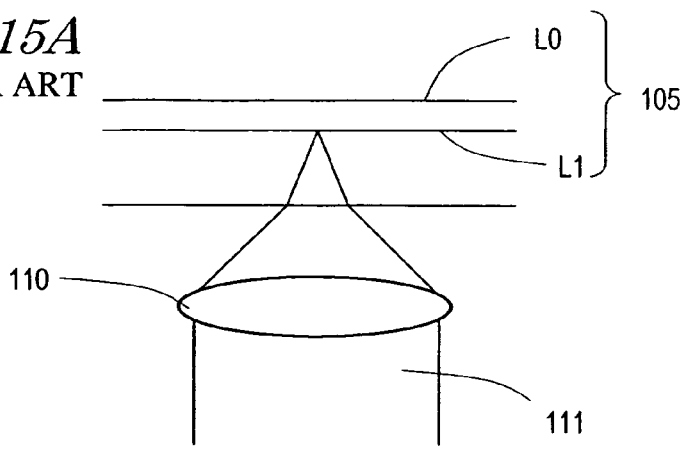

FIG. 15A illustrates a state in which the focal spot of the light 111 that has passed through the objective lens 110 is located on a data storage layer L0.

Figure 15B:
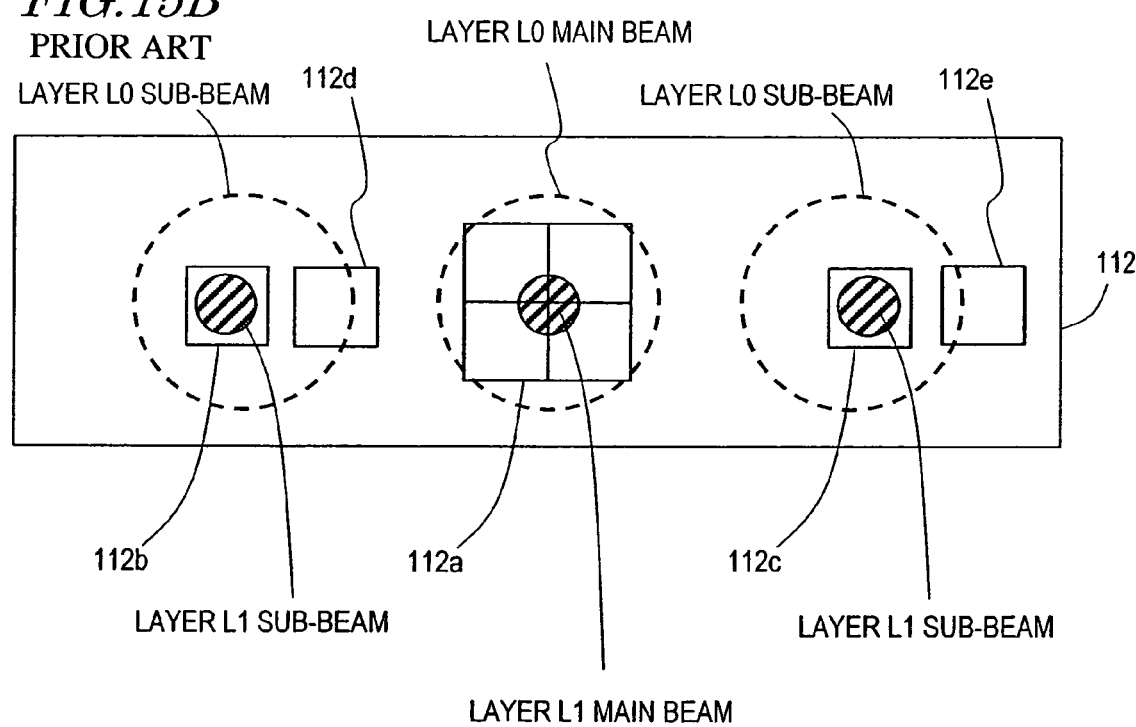

FIG. 15B shows the light detector 112 of the optical head and the light that has been reflected from the layer L1 and then received at the light detector 112.

DETAILED DESCRIPTION OF PREFERRED EMBODIMENTS

Embodiment 1

Hereinafter, preferred embodiments of the present invention will be described with reference to the accompanying drawings. In the following description, the optical data storage medium from/on which data is read or written optically is supposed to be an optical disc. Although the following specific preferred embodiments of the present invention relate to an optical head and an optical disc drive including the optical head, the present invention is in no way limited to those preferred embodiments.

Figure 1:
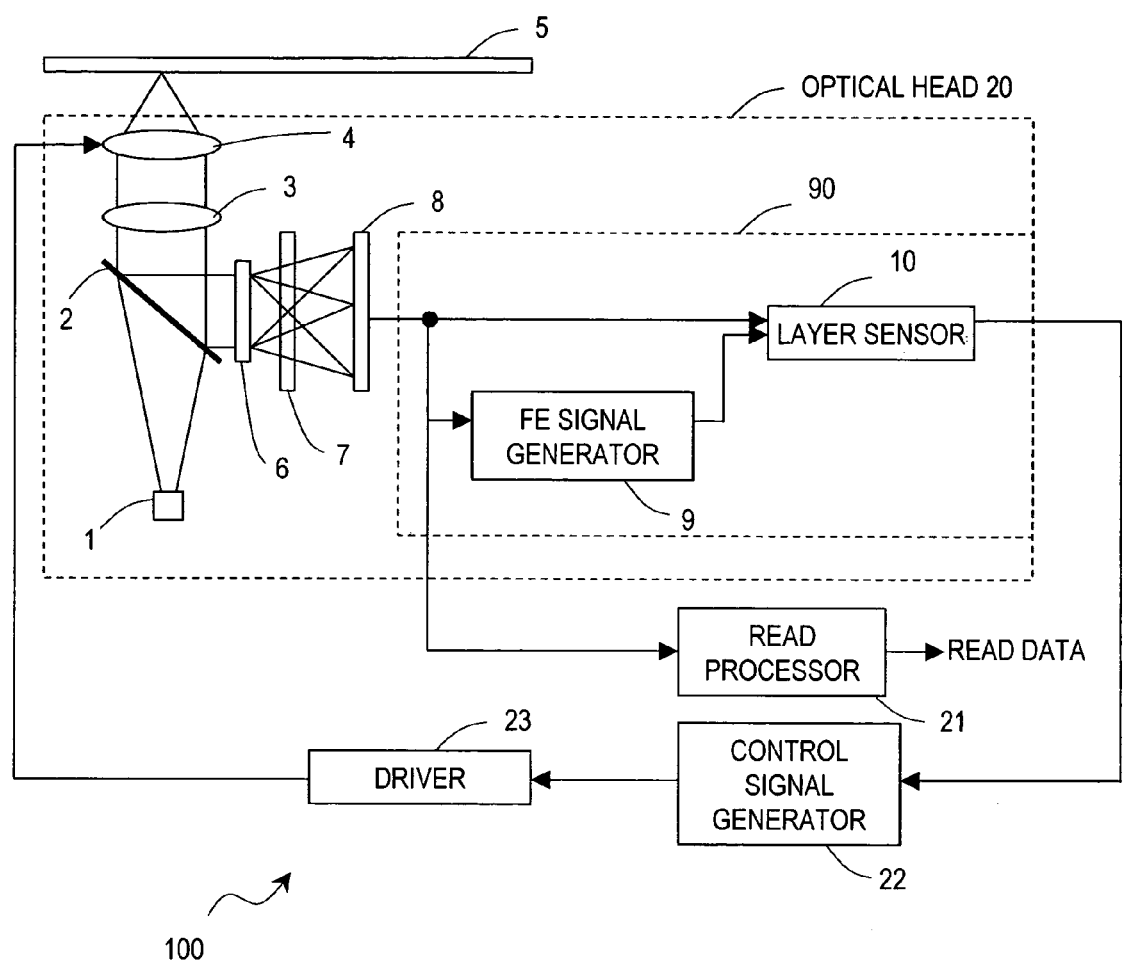
FIG. 1 shows an arrangement of functional blocks of an optical disc drive 100 according to a preferred embodiment of the present invention.

FIG. 1 shows how functional blocks of an optical disc drive 100 according to a preferred embodiment of the present invention may be arranged. As shown in FIG. 1, the optical disc drive 100 preferably includes an optical head 20, a read processor 21, a control signal generator 22, and a driver 23. The optical disc drive 100 can read and/or write data from/on a given optical disc 5 by using the optical head 20 and other components. The optical disc 5 may be a DVD or a Blu-ray disc (BD), for example. As will be described later, the optical disc 5 preferably includes a number of data storage layers, on each of which data may be stored. It should be noted that the optical disc 5 is not an integral part of the optical disc drive 100 but is illustrated in FIG. 1 for convenience sake.

The optical head 20 is preferably an optical system for emitting a light beam toward the optical disc 5 and receiving the light that has been reflected from the optical disc 5. The optical head 20 preferably reads and/or writes data from/on the optical disc 5. Furthermore, the optical head 20 preferably includes a signal generator 90 for generating a focus error (FE) signal, an RF signal and other signals. The detailed configuration of the optical head 20 will be described later.

In response to the FE signal supplied from the optical head 20, for example, the control signal generator 22 preferably generates a control signal for use to control the focal spot of the light beam perpendicularly to the optical disc 5. In this case, the control signal generator 22 preferably receives a signal, representing where the focal spot of the light is currently located, from the optical head 20, thereby generating a drive signal to shift the focal spot of the light to the target data storage layer to read data from and/or write data on.

The control signal generated by the control signal generator 22 is preferably output to the driver 23. In response to the control signal received, the driver 23 preferably generates a drive signal and then supplies it to a focus actuator (not shown). The focus actuator preferably moves either an objective lens 4 (to be described later) only or the optical head 20 in its entirety perpendicularly to the optical disc 5, thereby shifting the focal spot of the light beam perpendicularly to the optical disc 5. While a servo control operation such as a focus control or a tracking control is being carried out constantly, the read processor 21 preferably performs a predetermined read process on the light that has been reflected from the optical disc 5, thereby reading the data from the optical disc 5.

Hereinafter, the configuration of the optical head 20 will be described in further detail. The optical head 20 preferably includes a light source 1, a beam splitter 2, a collimator lens 3, the objective lens 4, a diffraction element 6, detector lens 7, a light detector 8 and the signal processor 90.

The light source 1 may emit a violet laser beam with a wavelength of 405 nm, for example. The beam splitter 2 preferably transmits a portion of the laser beam and reflects the rest of the light. The collimator lens 3 preferably transforms the light emitted from the light source 1 into a parallel light beam. The objective lens 4 preferably converges the light beam emitted from the light source 1, thereby producing a focal spot at a predetermined distance from the objective lens 4. The diffraction element 6 preferably receives the light beam that has been reflected from the optical disc 5 and then gets a portion of the light beam either deflected by a diffraction region with a predetermined pattern (i.e., a diffraction grating) or transmitted by a non-diffracting region with no pattern (i.e., transmitting region). To perform a focus detection by a so-called astigmatism method, the detector lens 7 preferably adds astigmatism to the passing light beam. The light detector 8 preferably includes a plurality of photodetectors, each of which preferably generates a light quantity signal representing the quantity of light received.

The signal processor 90 preferably includes an FE signal generator 9 and a layer sensor 10. In accordance with the light quantity signal supplied from a predetermined photodetector of the light detector 8, the FE signal generator 9 preferably generates an error signal representing how much the focal spot of the light has deviated perpendicularly to the optical disc 5 (i.e., a focus error (FE) signal). Also in accordance with the light quantity signal supplied from the predetermined photodetector of the light detector 8, the layer sensor 10 preferably locates the focal spot of the light, i.e., on or around which of a number of data storage layers of the given optical disc 5 the focal spot of the light is located. In this preferred embodiment, the signal processor 90 is supposed to be included in the optical head 20. Alternatively, instead of being included in the optical head 20, the signal processor 90 may form an integral part of a single control circuit along with the read processor 21 and control signal generator 22. Such a control circuit may be implemented as a so-called optical disc controller.

Hereinafter, it will be described, along the optical path of the light, exactly how this optical head 20 carries out its processing. The light emitted from the light source 1 is preferably transmitted through the beam splitter 2, transformed into a parallel light beam by the collimator lens 3, incident onto the objective lens 4, and then focused by the objective lens 4 onto one of the data storage layers of the optical disc 5. Thereafter, the light is reflected from the optical disc 5, passed through the objective lens 4 and collimator lens 3 again, incident onto the beam splitter 2 and then reflected by the beam splitter 2 toward the diffraction element 6.

The light that has been incident onto the diffraction element 6 may or may not be diffracted (i.e., deflected) depending on its point of incidence. Suppose the optical disc 5 has two data storage layers, for example. In that case, if the focal spot of the light is located on the shallower one of the two data storage layers, then the diffraction element 6 is preferably adjusted so as not to deflect the light that has been reflected from the deeper data storage layer. On the other hand, if the focal spot of the light is located on the deeper data storage layer, then the diffraction element 6 is preferably designed so as to deflect the light that has been reflected from the shallower data storage layer. It should be noted that each data storage layer is regarded herein as "shallow" or "deep" in a direction that is defined perpendicularly to the optical disc 5 from the incident plane of the light beam toward the depth of the optical disc 5. The direction that is defined perpendicularly to the optical disc 5 will be referred to herein as a "depth direction", too.

When a portion of the light that has been deflected by the diffraction element 6 reaches photodetectors included in the light detector 8, each of the photodetectors preferably generates a light quantity signal representing the quantity of the light received. More specifically, the light detector 8 preferably includes a photodetector for receiving the light beam that has been diffracted by the diffraction element 6 and another photodetector for receiving the light beam that has not been diffracted by the diffraction element 6. The light quantity signal supplied from the latter photodetector is preferably used to generate either a signal representing the data to be read out from the data storage layer or the FE signal.

The light quantity signal, which is supplied from the photodetector of the light detector 8 to generate the FE signal, is preferably output to the FE signal generator 9. In response to the light quantity signal supplied from the light detector 8, the FE signal generator 9 preferably generates an FE signal and then outputs it to the layer sensor 10. The layer sensor 10 preferably receives the light quantity signal from the photodetector that has received the diffracted light beam from the diffraction element 6 and the FE signal from the FE signal generator 9, respectively, thereby determining, according to the levels of these signals, on or around which data storage layer the focal spot is currently located. It will be described later how and why the layer sensor 10 can also locate the focal spot in the "vicinity" of some data storage layer. As a result of this decision, the layer sensor 10 preferably outputs a signal representing the current location of the focal spot of the light.

Hereinafter, it will be described with reference to FIGS. 2A, 2B, 3, 4 and 5 exactly how to perform the layer sensing process according to this preferred embodiment. In the following description, the two data storage layers of the optical disc 5 will be referred to herein as a "layer L0" and a "layer L1", respectively. In this case, the layer L0 is located deeper than the layer L1. For example, in a BD, the layer L1 is located at a depth of 75 µm as measured from the surface through which the incoming light beam passes, while the layer L0 is located 25 µm deeper than the layer L1.

Figure 2A:
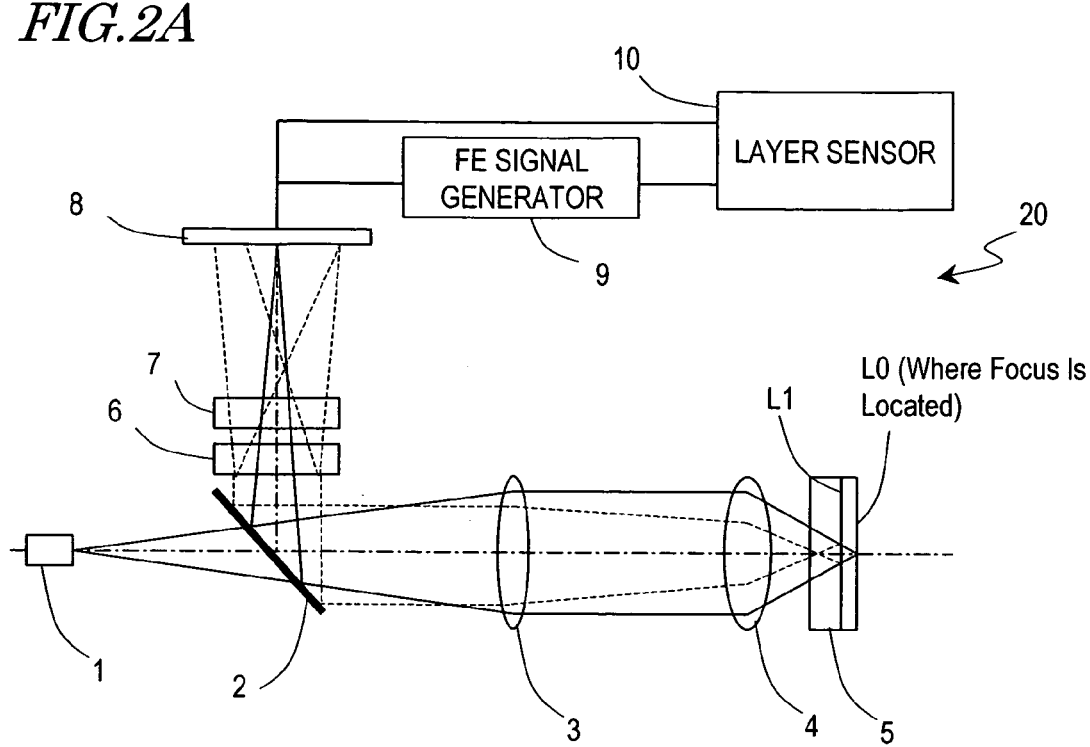
FIG. 2A shows how the light passes through the optical head 20, enters the optical disc 5 and then is reflected from the optical disc 5 when the focal spot is located on the layer L0.

FIG. 2A shows the light passing through the optical head 20, entering the optical disc 5 and then being reflected from the optical disc 5 when the focal spot is located on the layer L0. The reflected light will be described first. The light reflected from the layer L0 as represented by the solid lines is preferably transformed into a parallel light beam while passing through the objective lens 4. The parallel light beam is then incident onto the collimator lens 3 so as to be transformed into a converged light beam, which is next reflected by the beam splitter 2 and then incident onto the diffraction element 6.

Figure 3:
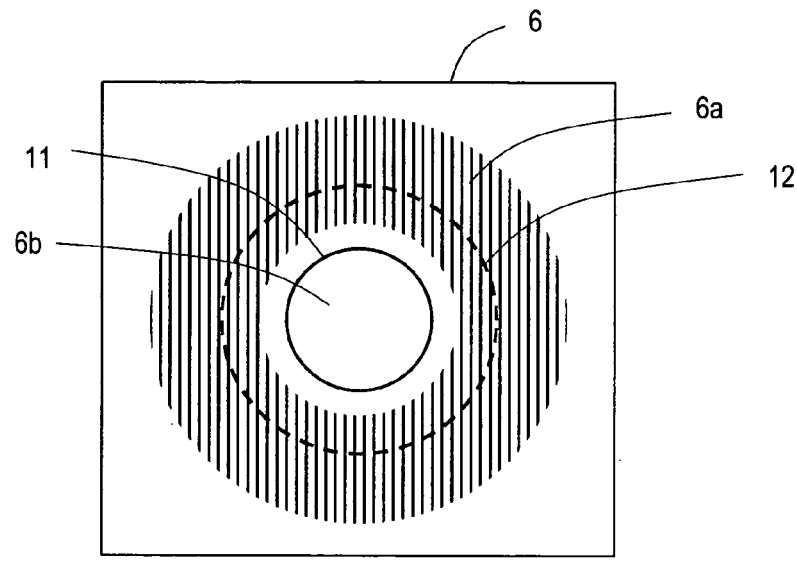
FIG. 3 shows a relationship between the diffraction pattern of the diffraction element 6 and the beam cross section of the incoming light.

The diffraction element 6 includes such a pattern as to transmit the light reflected from the layer L0 as it is without diffracting it. FIG. 3 shows a relationship between the diffraction pattern of the diffraction element 6 and the beam cross section of the incoming light. As shown in FIG. 3, the diffraction element 6 preferably has a diffraction grating region 6a and a non-diffraction grating region 6b. The diffraction grating region 6a (which will be referred to herein as a "diffracting region 6a") as represented by hatching in FIG. 3 preferably deflects a portion of the incoming light in a predetermined direction and transmits another portion of the light as it is. Alternatively, the diffracting region 6a may diffract a part of the portion of the incoming light in the opposite direction. On the other hand, the non-diffraction grating region 6b (which will be referred to herein as a "transmitting region 6b") preferably transmits the incoming light as it is without diffracting it at all.

FIG. 3 shows, by the solid circle, the beam cross section 11 of the light that has been reflected from the layer L0 and then incident onto the transmitting region 6b of the diffraction element. This optical disc drive 100 is preferably designed such that the light reflected from the layer L0 is incident onto the transmitting region 6b. As a result, the light reflected from the layer L0 directly enters a photodetector of the light detector 8.

Referring back to FIG. 2A, the light reflected from the layer L1 as represented by the dashed lines is preferably turned into a divergent light beam while passing through the objective lens 4, and then incident onto the collimator lens 3. Thus, the light reflected from the layer L1, having become a light beam with a more distant focal spot than the light reflected from the layer L0 (as represented by the solid lines), reaches the diffraction element 6 by way of the beam splitter 2. This means that the light reflected from the layer L1 has a bigger beam cross section than the light reflected from the layer L0. Accordingly, the light reflected from the layer L1 is incident not only on the transmitting region 6b of the diffraction element 6 but also on the diffracting region 6a thereof as well. FIG. 3 also shows, as the dashed circle, the beam cross section 12 of the light that has been reflected from the layer L1 and then incident onto the diffracting region 6a as well. In other words, this optical disc drive 100 is preferably designed such that the light reflected from the layer L1 is incident onto the diffracting region 6a. As a result, a portion of the light that has reached the diffracting region 6a is deflected and then incident onto a photodetector of the light detector 8.

Figure 4:
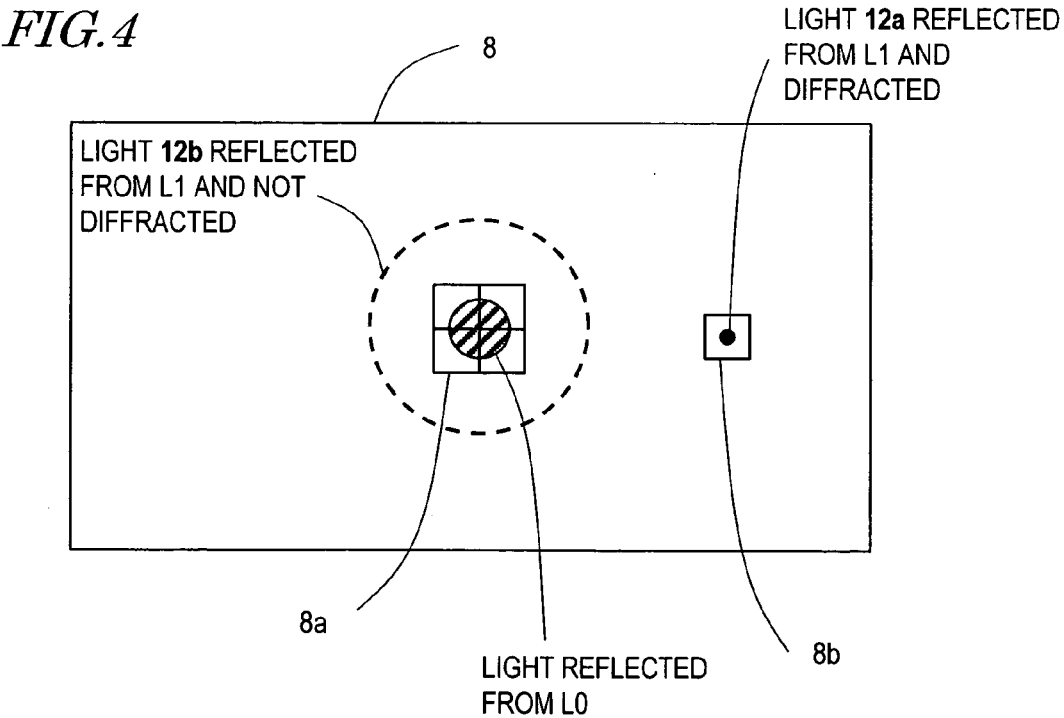
FIG. 4 shows a detailed configuration for the light detector 8.

FIG. 4 shows a detailed configuration for the light detector 8. The light detector 8 preferably includes a quadrant photodetector 8*a* and a layer-sensing photodetector 8*b*. The quadrant photodetector 8*a* is a set of four photodiodes, each of which preferably receives the light that has been transmitted through the transmitting region 6*b*, thereby outputting a light quantity signal representing the quantity of the light received there. Based on these light quantity signals, the FE signal generator 9 preferably generates an FE signal. The FE signal may be obtained by calculating the sum of the light quantity signals of each pair of diagonal photodiodes and the difference between the two sums, for example. On the other hand, the layer-sensing photodetector 8*b* preferably receives the light that has been diffracted by the diffracting region 6*a*, thereby outputting a light quantity signal representing the quantity of the light received. In accordance with this light quantity signal, the layer sensor 10 preferably generates a layer-sensing signal. The layer-sensing signal may either be the light quantity signal itself supplied from the layer-sensing photodetector 8*b* or be obtained by amplifying that light quantity signal by a predetermined factor.

FIG. 4 shows the light reflected from the layer L0 and the light reflected from the layer L1 when the focal spot is located on the layer L0. The light reflected from the layer L0 has been transmitted through the transmitting region 6*b* and then incident onto the quadrant photodetector 8*a* fully within the edges thereof. In this case, an FE signal and a tracking error signal can be generated in accordance with the light quantity signals supplied from the quadrant photodetector 8*a*.

On the other hand, a portion 12*a* of the light reflected from the layer L1 is preferably diffracted by the diffracting region 6*a* and then incident onto the layer-sensing photodetector 8*b*. Thus, the layer-sensing photodetector 8*b* preferably outputs a light quantity signal having a predetermined level, thereby obtaining a layer-sensing signal. In other words, if the level of the layer-sensing signal is equal to or higher than the predetermined level, then the focal spot should be located on or around the layer L0. This is because it is when the focal spot is located on the layer L0 that the light reflected from the layer L1 is incident onto the layer-sensing photodetector 8*b*. The layer-sensing signal is used herein to determine on or around which of the data storage layers the focal spot is currently located. The waveform of the layer-sensing signal will be described later with reference to FIGS. 5A and 5B.

On the other hand, the rest of the light reflected from the layer L1, i.e., the light that has not been diffracted by the diffracting region 6*a* but transmitted through the transmitting region 6*a* (non-diffracted light 12*b*), is incident onto a broad area of the light detector 8, including the quadrant photodetector 8*a*. Each of the four photodiodes of the quadrant photodetector 8*a* detects this non-diffracted light 12*b* and the light reflected from the layer L0 at the same time. However, the quantity of the light reflected from the layer L0 is much greater than that of the non-diffracted light 12*b* and the light 12*b* is incident uniformly onto all of the four photodiodes of the quadrant photodetector 8*a*. Accordingly, the effects of the light 12*b* reflected from the layer L1 are negligible in generating the FE signal, for example.

Figure 2B:
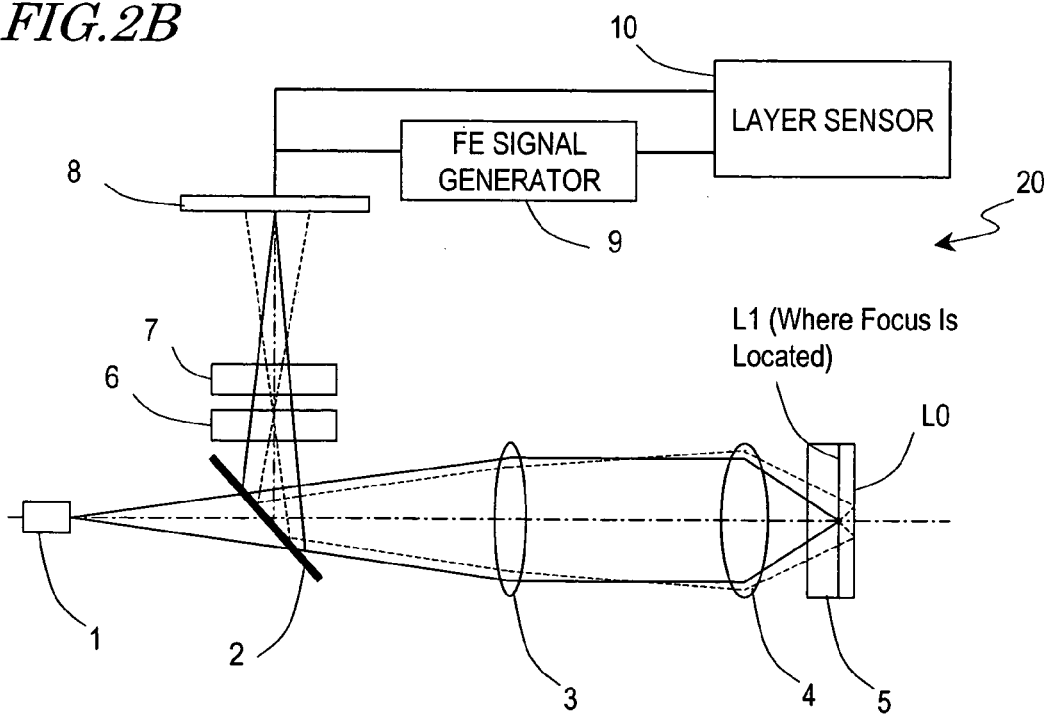
FIG. 2B shows how the light passes through the optical head 20, enters the optical disc 5 and then is reflected from the optical disc 5 when the focal spot is located on the layer L1.

FIG. 2B shows the light passing through the optical head 20, entering the optical disc 5 and then being reflected from the optical disc 5 when the focal spot is located on the layer L1. The reflected light will be described first, too. The light reflected from the layer L1 as represented by the solid lines follows the same optical path, and has the same beam cross section 11, as the light reflected from the layer L0 as shown in FIG. 2A, passes through the transmitting region 6*b*, and then enters the quadrant photodetector 8*a* of the light detector 8.

On the other hand, the light reflected from the layer L0 as represented by the dashed lines is preferably turned into a convergent light beam while passing through the objective lens 4, and then incident onto the collimator lens 3. Thus, the light reflected from the layer L0, having become a light beam with a less distant focal spot than the light reflected from the layer L1 (as represented by the solid lines), reaches the diffraction element 6 by way of the beam splitter 2. This means that the light reflected from the layer L0 has a smaller beam cross section than the light reflected from the layer L1. Accordingly, when the beam cross section of the light reflected from the layer L1 is represented as the solid circle 11 in FIG. 3, the light reflected from the layer L0 has a smaller beam cross section than the beam cross section 11.

To sum up, when the focal spot is located on the layer L1, both the light reflected from the layer L0 and the light reflected from the layer L1 are incident onto only the transmitting region 6*b* of the diffraction element 6, and neither of them reaches the layer-sensing photodetector 8*b*. As a result, the light quantity signal output from the layer-sensing photodetector 8*b* has a substantially zero level. In other words, if the level of the layer-sensing signal is less than a predetermined level, then the focal spot should be located on the layer L1. This is because when the focal spot is located on the layer L1, no reflected light is incident onto the layer-sensing photodetector 8*b*.

Portion (a) of FIG. 5 shows the waveform of the layer-sensing signal, while portion (b) of FIG. 5 shows the waveform of the FE signal. In FIG. 5, the abscissa represents the location of the focal spot and the ordinate represents the signal level. Each of these waveforms is obtained by shifting the focal spot of the light from a location deeper than the layer L0 to a location shallower than the layer L1. For that reason, the abscissa also represents the magnitude of focus shifting.

The waveform of the layer-sensing signal has a peak when the focal spot is located in the vicinity of the layer L0. Such a waveform is obtained because when the focal spot is located in the vicinity of the layer L0, the light reflected from the layer L1 is incident onto the diffracting region 6*a* and then converged onto the layer-sensing photodetector 8*b*. More specifically, as the focal spot goes away from the layer L0, the cross section of the light beam entering the layer-sensing photodetector 8*b* broadens and the point of incidence thereof shifts gradually, thus steeply decreasing the level of the layer-sensing signal detected.

In this preferred embodiment, a predetermined threshold level is preferably defined for the layer-sensing signal such that the layer sensor 10 detects the FE signal while the level of the layer-sensing signal is equal to or higher than the threshold level. That is to say, an FE signal detection window is preferably provided so as to be effective only while the level of the layer-sensing signal is equal to or higher than the threshold level. Accordingly, by determining whether or not the FE signal is detected within the detection window while the level of the layer-sensing signal is equal to or higher than the threshold level, the focal spot of the light can be located either on the layer L0 or the layer L1. While the FE signal is being detected, the focal spot of the light can be regarded as being currently located on near the layer L0. It should be noted that if the focal spot of the light is located within a focus controllable range to be defined with respect to the layer associated with the FE signal, then the layer sensor 10 can decide that the focal spot of the light is now located in the vicinity of that layer. In portion (b) of FIG. 5, the "vicinity" refers to a range that includes the position of the focal spot corresponding to a zero cross point of the FE signal and that includes positions of the focal spot corresponding to the local minimum and maximum values of the FE signal. The range may be wider than an interval between the positions of the focal spot corresponding to the local minimum and maximum values of the FE signal. The range is 5 to 10 µm in a DVD, for example.

It may be determined in the following manner whether or not the FE signal is detected within the detection window. Specifically, the layer sensor 10 stores the local maximum and minimum values of the output signal of the FE signal generator 9, and determines whether the difference between the local maximum and minimum values is greater or smaller than the predetermined value. If the difference is found greater than the predetermined value, the layer sensor 10 decides that the FE signal has been detected within the detection window. On the other hand, if the difference is found smaller than the predetermined value, the layer sensor 10 decides that no FE signal has been detected within the detection window.

Alternatively, the layer sensor 10 may also sense the layer without providing such a detection window. Specifically, while receiving the FE signal, the layer sensor 10 may detect and store the level of the layer-sensing signal when the FE signal crosses zero. And if the level is equal to or greater than a predetermined value, the layer sensor 10 may decide that the focal spot is currently located in the vicinity of the layer L0. On the other hand, if the level is less than the predetermined value, the layer sensor 10 may decide that the focal spot is now located in the vicinity of the layer L1.

As a result of the decision, the layer sensor 10 outputs a signal representing where the focal spot of the light is currently located. This signal has two levels. If the focal spot of the light is located in the vicinity of the layer L0, the layer sensor 10 may output the lower-level signal. On the other hand, if the focal spot of the light is located in the vicinity of the layer L1, the layer sensor 10 may output the higher-level signal.

Alternatively, the layer-sensing signal may used when a focus servo control is started. By referring to portions (a) and (b) of FIG. 5, if the local minimum of FE signal is detected in the state where a level of the layer-sensing signal is greater than a predetermined value, it is shown that the focul point of the light is approaching L0 layer from the side deeper than L0 layer. If the local maximum of FE signal is detected in the state where a level of the layer-sensing signal is greater than a predetermined value, it is shown that the focul point of the light is approaching L0 layer from the side shallower than L0 layer. On the other hand, if the local minimum of FE signal is detected in the state where a level of the layer-sensing signal is smaller than a predetermined value, it is shown that the focul point of the light is approaching L1 layer from the side deeper than L1 layer. If the local maximum of FE signal is detected in the state where a level of the layer-sensing signal is smaller than a predetermined value, it is shown that the focul point of the light is approaching L1 layer from the side shallower than L1 layer.

Since, even if the position of the focal spot of light cannot be recognized from the outside due to flutter of the optical disc 1, the optical disc drive 100 can acquire information of the move direction and position of the focus of the light to each layer, the optical disc drive 100 can immediately start focus servo control to an arbitrary layer. Accordingly, it is important to detect the layer-sensing signal in the range large enough in which the local maximum and the local minimum of FE signal are both detected.

As described above, if the optical disc drive 100 carries out this layer sensing process before starting a focus servo control operation, then the time it takes to access the data after the optical disc drive 100 has been turned ON can be shortened. Also, if the focal spot is located before data starts being read from, or written on, another layer, then the target layers can be switched quickly and reliably. Furthermore, according to the layer sensing technique described above, the layer-sensing signal is detected by getting the increase in the beam cross section of the light reflected from the shallower layer of the optical disc 5 sensed by the optical head and there is no need to use any sub-beams unlike the conventional three-beam method. Consequently, the layer sensing technique of this preferred embodiment is effectively applicable for use even in an optical head that adopts the single-beam method, not just in an optical head adopting the three-beam method.

Embodiment 2

The layer sensing process of the first preferred embodiment described above is supposed to be used in an optical disc including two data storage layers. A second specific preferred embodiment of the present invention to be described below is an optical disc drive that can sense any of three or more data storage layers of a given optical disc. However, in the following description of the second preferred embodiment, an optical disc including three data storage layers will be taken as an example for the sake of simplicity.

The overall configuration of the optical disc drive of this second preferred embodiment is the same as that of the optical disc drive 100 of the first preferred embodiment shown in FIG. 1 except the configuration of the optical head. Accordingly, for this second preferred embodiment, the description of the overall configuration of the optical disc drive will be omitted except for the optical head.

FIG. 6 shows an arrangement for an optical head 30 according to this second preferred embodiment for use to process an optical disc 5 including three data storage layers. The optical head 30 of the second preferred embodiment is different from the optical head 20 of the first preferred embodiment in that the diffraction element 6 and light detector 8 of the first preferred embodiment are replaced with a diffraction element 13 and a light detector 14, respectively, in this second preferred embodiment. However, the optical heads 20 and 30 share the other components, each of which is identified in FIG. 6 by the same reference numeral as that used in FIGS. 2A and 2B and of which the description will be omitted herein.

In this preferred embodiment, the optical disc 5 preferably includes three data storage layers L2, L1 and L0, which are stacked in this order from the incident plane of the optical disc 5 toward the depth thereof and which will be referred to herein as a "layer L2", a "layer L1" and a "layer L0", respectively. FIG. 6 shows how the light passes through the optical head 30 of this preferred embodiment, enters the optical disc 5 and then is reflected from the optical disc 5 when the focal spot is located on the layer L0. In FIG. 6, the light reflected from the layer L0 is represented by the solid lines, the light reflected from the L1 is represented by the dashed lines, but the light reflected from the layer L2 is not illustrated to make this drawing easily understandable. Each of the three light beams reflected from these three layers follows the same optical path as the counterpart of the first preferred embodiment described above until the light beam is reflected by the beam splitter 2. However, it should be noted that the beam cross section of the light reflected from the layer L2 is bigger than that of the light reflected from the layer L1. The reason is that the light reflected from the layer L2 is more divergent than the light reflected from the layer L1 when entering the objective lens 4 and then travels as such a divergent light beam through the optical head 30. The light beams reflected from the layers L1 and L2 are passed through the collimator lens 3 so as to be transformed into light beams to be focused beyond the light detector 14. The focal spot of the light reflected from the layer L2 is more distant from the light detector 14 than that of the light reflected from the layer L1.

Hereinafter, the configuration of the diffraction element 13 will be described with reference to FIG. 7. FIG. 7 shows a relationship between the diffraction pattern of the diffraction element 13 and the beam cross section of the incoming light. As shown in FIG. 7, the diffraction element 13 preferably has diffraction grating regions 13*a* and 13*b* and a non-diffraction grating region 13*c*. Each of the diffraction grating regions 13*a* and 13*b* (which will be referred to herein as "diffracting regions 13*a* and 13*b*") as represented by hatching in FIG. 7 preferably deflects a portion of the incoming light in a predetermined direction and transmits another portion of the light as it is. It should be noted that the diffracting regions 13*a* and 13*b* have mutually different deflection directions. On the other hand, the non-diffraction grating region 13*c* (which will be referred to herein as a "transmitting region 13*c*") preferably transmits the incoming light as it is without diffracting it at all.

FIG. 7 shows the beam cross section 11 of the light that has been reflected from the layer L0 and then incident onto the transmitting region 13*c* of the diffraction element 13 when the focal spot is located on the layer L0. The beam cross section 12*a* of the light that has been reflected from the layer L1 and then incident onto the diffracting region 13*a* and the beam cross section 12*b* of the light that has been reflected from the layer L2 and then incident onto the diffracting region 13*b* are also shown in FIG. 7. As described above, the cross-sectional area of the light beam reflected from the layer L2 is bigger than that of the light beam reflected from the layer L1. Accordingly, the beam cross section 12*a* represents the light reflected from the layer L1 and the beam cross section 12*b* represents the light reflected from the layer L2.

Next, the configuration of the light detector 14 for receiving the light that has been transmitted through the diffraction element 13 will be described with reference to FIG. 8. FIG. 8 shows a detailed configuration for the light detector 14. The light detector 14 preferably includes a quadrant photodetector 14*a* and layer-sensing photodetectors 14*b* and 14*c*. The photodetector 14*a* preferably receives the light that has been transmitted through the transmitting region 13*c*, and then operates just like the quadrant photodetector 8*a* of the first preferred embodiment described above. Based on the light quantity signals supplied from the photodetector 14*a*, the FE signal generator 9 preferably generates an FE signal.

On the other hand, the layer-sensing photodetector 14*b* preferably receives the light that has been reflected from layer L1 and diffracted by the diffracting region 13*a*, while the layer-sensing photodetector 14*c* preferably receives the light that has been reflected from layer L2 and diffracted by the diffracting region 13*b*. Thereafter, each of these layer-sensing photodetectors 14*b* and 14*c* preferably operates and functions just like the layer-sensing photodetector 8*b* of the first preferred embodiment described above. In accordance with the light quantity signals supplied from the layer-sensing photodetectors 14*b* and 14*c*, the layer sensor 10 preferably generates a layer-sensing signal.

Hereinafter, the layer sensing process to be performed by the optical disc drive having the configuration of this second preferred embodiment will be described. Portions (a) and (b) of FIG. 9 show the waveforms of the two layer-sensing signals, while portion (c) of FIG. 9 shows the waveform of the FE signal. In FIG. 9, the abscissa represents the location of the focal spot and the ordinate represents the signal level. Each of these waveforms is obtained by shifting the focal spot of the light from a location deeper than the layer L0 to a location shallower than the layer L2. For that reason, the abscissa also represents the magnitude of focus shifting.

Portions (a) and (b) of FIG. 9 show a second layer-sensing signal, generated based on the light quantity signal supplied from the photodetector 14*c*, and a first layer-sensing signal, generated based on the light quantity signal supplied from the photodetector 14*b*, respectively. When the focal spot is located in the vicinity of the layer L0, the first and second layer-sensing signals both have peaks. Accordingly, if the first and second layer-sensing signals both have peaks when the optical disc 5 is loaded into the optical disc drive 100, then the optical disc drive 100 can decide that the focal spot is currently located on or in the vicinity of the layer L0. And the optical disc drive 100 may decide that the focal spot is located on the layer L0 when the level of the FE signal crosses zero.

On the other hand, when the focal spot is located in the vicinity of the layer L1, the second layer-sensing signal has no peaks but only the first layer-sensing signal has a peak. Accordingly, if only the first layer-sensing signal has a peak when the optical disc 5 is loaded into the optical disc drive 100, then the optical disc drive 100 can decide that the focal spot is currently located on near the layer L1. And the optical disc drive 100 may decide that the focal spot is located on the layer L1 when the level of the FE signal crosses zero.

Furthermore, when the focal spot is located in the vicinity of the layer L2, neither the first nor second layer-sensing signal has any peak. Accordingly, if neither the first nor second layer-sensing signal has peaks when the optical disc 5 is loaded into the optical disc drive 100, then the optical disc drive 100 can decide that the focal spot is currently located on near the layer L2. And the optical disc drive 100 may decide that the focal spot is located on the layer L2 when the level of the FE signal crosses zero. In this manner, each of these three data storage layers can be sensed as in the first preferred embodiment described above by using the two layer-sensing signals and FE signal detected.

Alternatively, the layer-sensing signal may used when a focus servo control is started. By referring to portions (a) (b) and (c) of FIG. 9, if the local minimum of FE signal is detected in the state where levels of the first and the second layer-sensing signal are greater than a predetermined value, it is shown that the focul point of the light is approaching L0 layer from the side deeper than L0 layer. If the local maximum of FE signal is detected in the same state as noted above, it is shown that the focul point of the light is approaching L0 layer from the side shallower than L0 layer.

If the local minimum of FE signal is detected in the state where a level of the first layer-sensing signal is greater than a predetermined value and where a level of the second layer-sensing signal is smaller than a predetermined value, it is shown that the focul point of the light is approaching L1 layer from the side deeper than L1 layer.

If the local minimum of FE signal is detected in the state where levels of the first and the second layer-sensing signal are smaller than a predetermined value, it is shown that the focul point of the light is approaching L2 layer from the side deeper than L2 layer. If the local maximum of FE signal is detected in the same state noted above, it is shown that the focul point of the light is approaching L2 layer from the side shallower than L2 layer.

Since, even if the position of the focal spot of light cannot be recognized from the outside due to flutter of the optical disc 1, the optical disc drive 100 can acquire information of the move direction and position of the focus of the light to each layer, the optical disc drive 100 can immediately start focus servo control to an arbitrary layer.

In the preferred embodiment described above, only the light beams that have been reflected from the layers L1 and L2 and then incident onto the photodetectors 14b and 14c, respectively, are taken into consideration for the sake of simplicity. Actually, though, other light beams may have been reflected from the layers L1 and L2 and then transmitted through the diffraction element 13 or diffracted in the opposite direction by the diffraction gratings of the diffraction regions 13a and 13b. However, the description of those other light beams will be omitted herein because those light beams have nothing to do with the gist of the present invention. Furthermore, the light beam that has been reflected from the layer L1 and then incident onto the diffracting region 13b and the light beam that has been reflected from the layer L2 and then incident onto the diffracting region 13a are magnified by the lens action of the diffraction grating and incident onto the light detector 14 as broadened light beams, which are hardly sensible to the photodetectors 14b and 14c. This is why these light beams have no significant effects on the layer sensing process described above.

In the preferred embodiment described above, the optical disc 5 is supposed to have three data storage layers. However, the present invention is in no way limited to that specific preferred embodiment but may be equally applicable for use even when the optical disc 5 includes a number N (where N is an integer equal to or greater than four) of data storage layers. That is to say, just as providing the regions 13a, 13b and 13c for the diffraction element 13 and the photodetectors 14a, 14b and 14c for the light detector 14, the optical head 20 and the optical disc drive 100 may be designed so as to detect the N light beams that have been reflected from the respective data storage layers and obtain a number (N−1) of layer-sensing signals and one FE signal. In that case, if all of those (N−1) layer-sensing signals have peaks, then the optical disc drive may decide that the focal spot is currently located on the deepest data storage layer. And if (N−2) layer-sensing signals have peaks, then the optical disc drive may decide that the focal spot is currently located on the second deepest layer. The layers L0 and L1 of the preferred embodiments described above may be arbitrarily selected from the N layers.

In the first and second preferred embodiments described above, the diffracting regions are illustrated as ringlike ones. However, the diffracting regions do not have to be continuous rings. For example, just portions of the ring may be diffracting regions. Alternatively, rectangular diffracting regions may be arranged here and there. As another alternative, the diffraction pattern (i.e., diffraction grating) of the diffracting regions may also be replaced with a prism, a lens or any other suitable optical element for deflecting or converging incoming light.

Embodiment 3

A third specific preferred embodiment of the present invention is an optical head for processing an optical disc with a number of data storage layers by determining whether the other layers are located deeper or shallower than the target data storage layer to be sensed. Speaking more generally, the optical head can locate a given data storage layer with respect to the focal spot of light. In the following description of the third preferred embodiment, the optical disc is supposed to include two data storage layers L0 and L1, which are defined just as in the first preferred embodiment described above.

The overall configuration of the optical disc drive of this third preferred embodiment is the same as that of the optical disc drive 100 of the first preferred embodiment shown in FIG. 1 except the configuration of the optical head. Accordingly, for this third preferred embodiment, the description of the overall configuration of the optical disc drive will be omitted except for the optical head.

FIG. 10 shows an arrangement for an optical head 40 according to this third preferred embodiment. The optical head 40 of the third preferred embodiment is different from the optical head 20 of the first preferred embodiment in that the diffraction element 6 and light detector 8 of the first preferred embodiment are replaced with a diffraction element 15 and a light detector 16, respectively, in this third preferred embodiment. However, the optical heads 20 and 40 share the other components, each of which is identified in FIG. 10 by the same reference numeral as that used in FIGS. 2A and 2B and of which the description will be omitted herein. FIG. 10 shows a state in which the focal spot is located on the layer L0 of the optical disc 5.

Hereinafter, the configuration of the diffraction element 15 will be described with reference to FIG. 11. FIG. 11 shows a relationship between the diffraction pattern of the diffraction element 15 and the beam cross section of the incoming light. As shown in FIG. 11, the diffraction element 15 preferably has a diffraction grating region 15a and a non-diffraction grating region 15b. The diffraction grating region 15a (which will be referred to herein as a "diffracting region 15a") as represented by hatching in FIG. 11 preferably deflects a portion of the incoming light in a predetermined direction and transmits another portion of the light as it is. On the other hand, the non-diffraction grating region 15b (which will be referred to herein as a "transmitting region 15b") preferably transmits the incoming light as it is without diffracting it at all. In this preferred embodiment, the diffracting and transmitting regions 15a and 15b preferably deflect half of the light that has entered the diffraction element 15 and transmit the other half. As used herein, the "half" of the incoming reflected light refers to the physical cross-sectional area of the reflected light beam when taken perpendicularly to the optical axis of the light. For example, if the beam cross section is circular, the diffracting region 15a preferably deflects the incoming light with a semicircular beam cross section.

FIG. 11 also shows the beam cross section 11 of the light reflected from the layer L0 and the beam cross section 12a of the light reflected from the layer L1 when the focal spot is located on the layer L0. On the other hand, when the focal spot is located on the layer L1, the light reflected from the layer L1 has the beam cross section 11 but the light reflected from the layer L0 has a beam cross section 12c as shown in FIG. 11.

Next, the configuration of the light detector 16 for receiving the light that has been transmitted through the diffraction element 15 will be described with reference to FIG. 12. FIG. 12 shows a detailed configuration for the light detector 16.

The light detector 16 preferably includes a quadrant photodetector 16a and layer-sensing photodetectors 16b and 16c. The quadrant photodetector 16a preferably receives the light that has been transmitted through the transmitting region 15b, and then operates just like the quadrant photodetector 8a of the first preferred embodiment described above. Based on the light quantity signals supplied from the quadrant photodetector 16a, the FE signal generator 9 preferably generates an FE signal. On the other hand, the layer-sensing photodetectors 16b and 16c preferably receive the light that has been diffracted by the diffracting region 15a.

It should be noted that the diffracting region 15a diffracts half of the light beam being transmitted. Accordingly, the semicircular beam cross section of the light received at the light detector 16 changes its directions depending on whether or not the focal spot of the light beam is closer to the diffraction element 15 than to the light detector 16. After having received the light beam, each of these layer-sensing photodetectors 16b and 16c operates and functions just like the layer-sensing photodetector 8b of the first preferred embodiment described above.

FIGS. 13A and 13B show the beam cross sections of the reflected light that has been received at the layer-sensing photodetectors 16b and 16c. Specifically, FIG. 13A shows what beam cross section the received light forms if there is another data storage layer shallower than the data storage layer on which the focal spot is currently located. As shown in FIG. 13A, the beam cross section 17a of the reflected light is formed on the light detector 16 such that when the bottom of the semicircular beam cross section 17a is defined by its chord, the top of the semicircular beam cross section 17a is defined by its arc. Looking at the beam cross section formed on the diffracting region 15a shown in FIG. 11, when the bottom of the semicircle is defined by its chord, the top of the semicircle is also defined by its arc. Accordingly, in this case, the reflected light enters the light detector 16 without turning its beam cross section upside down so to speak. This means that the focal spot of the reflected light is not located between the diffraction element 15 and the light detector 16 but at a location farther from the diffraction element 15 than the light detector 16 is (i.e., beyond the light detector 16). As already described for the first preferred embodiment with reference to FIG. 2A, such reflected light can be regarded as having been reflected from the layer L1 when the focal spot is located on the layer L0.

In the state shown in FIG. 13A, most of the reflected light impinging on the light detector 16 enters the layer-sensing photodetector 16c and no part of the reflected light reaches the layer-sensing photodetector 16b. Accordingly, while the FE signal is being detected, the layer sensor 10 preferably compares the levels of the output layer-sensing signals of the layer-sensing photodetectors 16b and 16c with each other. If the level of the output layer-sensing signal of the layer-sensing photodetector 16c is found higher than that of the output layer-sensing signal of the other layer-sensing photodetector 16b, then the layer sensor 10 can decide that there is another data storage layer shallower than the layer on which the focal spot is currently located. It should be noted that the light reflected from the layer on which the focal spot is currently located forms a far narrower beam spot 17b in the gap between the layer-sensing photodetectors 16b and 16c in FIG. 13A. The light detector 16 is preferably designed such that none of the photodetectors detects the beam spot 17b.

On the other hand, FIG. 13B shows what beam cross section the received light has if there is another data storage layer deeper than the data storage layer on which the focal spot is currently located. As opposed to the example shown in FIG. 13A, the semicircular beam cross section 17c is formed on the light detector 16 upside down as compared with the beam cross section formed on the diffracting region 15a of the diffraction element 15. This means that the focal spot of the reflected light is located between the diffraction element 15 and the light detector 16. As already described for the first preferred embodiment with reference to FIG. 2B, such reflected light can be regarded as having been reflected from the layer L0 when the focal spot is located on the layer L1.

In the state shown in FIG. 13B, most of the reflected light impinging on the light detector 16 enters the layer-sensing photodetector 16b and no part of the reflected light reaches the layer-sensing photodetector 16c. Accordingly, while the FE signal is being detected, the layer sensor 10 preferably compares the levels of the output layer-sensing signals of the layer-sensing photodetectors 16b and 16c with each other. If the level of the output layer-sensing signal of the layer-sensing photodetector 16b is found higher than that of the output layer-sensing signal of the other layer-sensing photodetector 16c, then the layer sensor 10 can decide that there is another data storage layer deeper than the layer on which the focal spot is currently located. It should be noted that the light reflected from the layer on which the focal spot is currently located forms the far narrower beam spot 17b in the gap between the layer-sensing photodetectors 16b and 16c just as described above. However, the light detector 16 is also designed such that none of the photodetectors detects the beam spot 17b.

The levels of the two layer-sensing signals do not always have to be compared. Instead, the other layer may also be sensed by defining a predetermined reference value and determining whether or not the level of at least one layer-sensing signal exceeds that reference value. For example, if the only layer-sensing signal, supplied from the layer-sensing photodetector 16c, has a level that is equal to or greater than a predetermined value, then it may be decided that there is another data storage layer shallower than the layer on which the focal spot is currently located (i.e., the state shown in FIG. 13A). On the other hand, if the layer-sensing signal has a level that is less than the predetermined value, then it may be decided that there is another data storage layer deeper than the layer on which the focal spot is currently located (i.e., the state shown in FIG. 13B). In the example illustrated in FIGS. 13A and 13B, the beam spot 17b of the light that has been reflected from the layer on which the focal spot is currently located is not detected by the photodetector 16b or 16c. Alternatively, the beam spot may also be detected by the photodetectors 16b and 16c equally.

The example illustrated in FIGS. 13A and 13B relates to the optical disc 5 having two data storage layers. As for an optical disc 5 with three or more data storage layers, the layer sensor 10 preferably operates as follows so as to locate the focal spot. Specifically, if the output layer-sensing signals of the two layer-sensing photodetectors 16b and 16c both have a predetermined level, then the layer sensor 10 preferably decide that the focal spot is currently located on or around an intermediate data storage layer. This is because such layer-sensing signals show that shallower and deeper data storage layers are both present. It should be noted that the "intermediate data storage layer" may refer to any data storage layer other than the shallowest and deepest data storage layers.

On the other hand, if only the layer-sensing signal output from the photodetector 16c has the predetermined level, then the layer sensor 10 decides for the same reason as that described for the example shown in FIG. 13A that the focal spot is currently located on or around the deepest data storage layer. Furthermore, if only the layer-sensing signal output from the photodetector 16b has the predetermined level, then the layer sensor 10 decides for the same reason as that described for the example shown in FIG. 13B that the focal spot is currently located on or around the shallowest data storage layer.

Consequently, if the optical disc 5 has three data storage layers, the layer sensor 10 can sense any of the three layers on which the focal spot is potentially located. Also, even if the optical disc 5 has four or more data storage layers, the layer sensor 10 can still sense at least the deepest and shallowest layers.

The preferred embodiment described above relates to a particular situation where the focal spot of the light is located on some data storage layer. However, as in the first and second preferred embodiments described above, this third preferred embodiment is also applicable to a situation where the focal spot is located in the vicinity of some data storage layer. The "vicinity" refers to the same range as that defined for the first preferred embodiment.

As described above, the optical disc drive according to the preferred embodiment of the present invention preferably detects how divergent the light reflected from another data storage layer, which is either shallower or deeper than the data storage layer where the focal spot is currently located, is (i.e., how convergent the light beam is within the optical head). In this manner, the optical disc drive can locate any other data storage layer with respect to the particular data storage layer on which the focal spot is currently located.

In the preferred embodiment described above, the diffraction element 15 shown in FIG. 11 is provided with the diffracting region 15a and transmitting region 15b for the sake of simplicity. Optionally, another diffraction grating may be provided for the transmitting region 15b, too, so that the light beam with the beam cross section 11 is transmitted at a uniform transmittance over the entire region where the light beam passes. Also, in the example illustrated in FIGS. 13A and 13B, the effects of the astigmatism produced by the detector lens 7 are ignored for the sake of simplicity of description and illustration. However, since the gap between the two data storage layers is sufficiently broader than the astigmatic difference of the astigmatism produced, substantially no effects should be caused on the detection process of this preferred embodiment.

In the preferred embodiment described above, a so-called "Foucault method", which is known as one of the most effective focus detecting methods, is adopted to detect the divergent state of the light that has been reflected from another layer, which is either shallower or deeper than the layer on which the focal spot is currently located. However, the present invention is in no way limited to such a specific preferred embodiment but may adopt any other focus detecting method (e.g., a spot size detection method) instead of the Foucault method.

In various preferred embodiments of the present invention described above, the optical head always includes a diffraction element, a detector lens, and light detector as its independent components. However, the present invention is in no way limited to those specific preferred embodiments. Alternatively, portions of the diffraction element, detector lens and light detector may be either omitted or combined together such that the reflected light required for each preferred embodiment enters the respective light-receiving areas of the light detector. For example, the diffracting and transmitting regions 6a and 6b of the diffraction element 6 shown in FIG. 3 may be provided as a light detector having light-receiving areas in corresponding shapes. Then, an optical head, which can receive light beams with beam cross sections 11 and 12 separately and which operates under a similar principle to the optical head 20 of the first preferred embodiment described above, can be obtained.

In the preferred embodiments of the present invention described above, an optical disc is used as an exemplary optical data storage medium. However, the present invention is also applicable for use in any other optical data storage medium. For example, the present invention is also implementable with a card storage medium with a plurality of data storage layers, from any of which data can be read optically. To read data from an optical disc, the optical disc usually needs to be rotated. However, the processing of present invention is done before data actually starts being read. Accordingly, the optical data storage medium does not always have to be rotated according to the present invention.

A read/write drive including an optical head according to any of various preferred embodiments of the present invention described above can sense very quickly on or around which layer the focal spot of the light is currently located. Thus, the present invention provides an optical disc drive, which can access a target location on the given optical disc in a much shorter time after having been turned ON and which can switch the target layers very quickly and reliably in starting to read and/or write data from/on a different layer from the current one, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2003-124047 filed on Apr. 28, 2003 and No. 2004-125302 filed on Apr. 21, 2004, the entire contents of which are hereby incorporated by reference.

What is claimed is:

1. A drive for reading and/or writing data from/on an optical data storage medium loaded, including a first data storage layer and a second data storage layer that are stacked in this order from the surface thereof toward the depth thereof, by radiating light through the surface toward the depth of the optical data storage medium, the drive comprising:

a light source for emitting the light;

a lens for producing a focal spot by converging the light that has been emitted from the light source;

a light detector, which includes at least one photodetector for receiving the light and generating a light quantity signal representing quantity of the light received, the at least one photodetector being used as a layer-sensing photodetector that is designed so as not to receive the light reflected from the second data storage layer when the focal spot is located on the first data storage layer and so as to receive the light reflected from the first data storage layer when the focal spot is located on the second data storage layer; and a layer sensor for determining, in accordance with the light quantity signal representing the quantity of the light received at the layer-sensing photodetector, where the focal spot is now located, on the first data storage layer, on the second data storage layer, or in the vicinity thereof.

2. The drive of claim 1, further comprising a diffraction element including a diffracting region for deflecting the receive light, wherein when the focal spot is located on the second data storage layer, the diffracting region deflects the light, reflected from the first data storage layer, toward the layer-sensing photodetector.

3. The drive of claim 2, further comprising a signal generator for generating a focus error signal, wherein the diffraction element includes a transmitting region for transmitting the light reflected from the first data storage layer if the focal spot is located on the first data storage layer, and wherein the light detector further includes a processing photodetector, which includes a plurality of divided areas to receive the light transmitted through the transmitting region, and wherein the signal generator generates the focus error signal in accordance with the light quantity signals representing the quantities of the light received at the divided areas, and wherein the layer sensor locates the focal spot in accordance with the focus error signal.

4. The drive of claim 1, further comprising a diffraction element including a diffracting region for deflecting the receive light, wherein the light detector is arranged between a point toward which the light reflected from the second data storage layer converges when the focal spot is located on the first data storage layer and a point toward which the light reflected from the first data storage layer converges when the focal spot is located on the second data storage layer, and wherein when the focal spot is located on the second data storage layer, the diffracting region deflects a portion of the light reflected from the first data storage layer such that the deflected light enters the layer-sensing photodetector, and wherein when the focal spot is located on the first data storage layer, the diffracting region deflects a portion of the light reflected from the second data storage layer such that the deflected light enters another region of the light detector, not the layer-sensing photodetector, and wherein in accordance with the light quantity signal, the layer sensor locates the first and second data storage layers with respect to the focal spot.

5. The drive of claim 1, wherein the optical data storage medium further includes a third data storage layer, which is located deeper from the surface of the optical data storage medium than the second data storage layer is, and wherein the layer-sensing photodetector includes a first photosensitive element, which is designed so as to receive the light reflected from the first data storage layer when the focal spot is located on the third data storage layer, and a second photosensitive element, which is designed so as to receive the light reflected from the second data storage layer when the focal spot is located on the third data storage layer, and wherein the layer sensor determines, in accordance with the light quantity signals supplied from the first and second photosensitive elements, whether or not the focal spot is located on the third data storage layer of the optical data storage medium loaded.

6. The drive of claim 5, further comprising a diffraction element including a diffracting region for deflecting the receive light, wherein when the focal spot is located on the third data storage layer, the diffracting region deflects the light, reflected from the first data storage layer, toward the first photosensitive element and the light, reflected from the second data storage layer, toward the second photosensitive element, respectively, and wherein when the focal spot is located on the second data storage layer, the diffracting region deflects the light, reflected from the first data storage layer, toward the first photosensitive element but does not deflect the light, reflected from the second or third data storage layer, toward the second photosensitive element, and wherein the layer sensor determines, in accordance with the light quantity signals supplied from the first and second photosensitive elements, on what data storage layer of the optical data storage medium the focal spot is now located.

7. The drive of claim 6, further comprising a signal generator for generating a focus error signal, wherein the diffraction element includes a transmitting region for transmitting the light reflected from the first data storage layer if the focal spot is located on the first data storage layer, the light reflected from the second data storage layer if the focal spot is located on the second data storage layer, and the light reflected from the third data storage layer if the focal spot is located on the third data storage layer, respectively, and wherein the light detector further includes a processing photodetector, which includes a plurality of divided areas to receive the light transmitted through the transmitting region, and wherein the signal generator generates the focus error signal in accordance with the light quantity signals representing the quantities of the light received at the divided areas, and wherein the layer sensor locates the focal spot in accordance with the focus error signal.

8. The drive of claim 3, further comprising a read processor for reading the data from the optical data storage medium in accordance with the light quantity signal supplied from the processing photodetector.

9. The drive of claim 1, wherein the optical data storage medium includes a number N (where N is an integer that is equal to or greater than four) of data storage layers, the first data storage layer being one of the (N−1) data storage layers except the deepest layer as measured from the surface toward the depth, the second data storage layer being deeper than the first data storage layer as measured from the surface toward the depth.

10. An optical head for reading and/or writing data from/on an optical data storage medium loaded, including a first data storage layer and a second data storage layer that are stacked in this order from the surface thereof toward the depth thereof, by radiating light through the surface toward the depth of the optical data storage medium, the optical head comprising:

a light source for emitting the light;

a lens for producing a focal spot by converging the light that has been emitted from the light source;

a light detector, which includes at least one photodetector for receiving the light and generating a light quantity signal representing quantity of the light received, the at least one photodetector being used as a layer-sensing photodetector that is designed so as not to receive the light reflected from the second data storage layer when the focal spot is located on the first data storage layer and so as to receive the light reflected from the first data storage layer when the focal spot is located on the second data storage layer; and a layer sensor for determining, in accordance with the light quantity signal supplied from the layer-sensing photodetector, on which of the first and second data storage layers of the optical data storage medium the focal spot is now located.

11. A controller to be implemented in an drive, the drive being used to read and/or write data from/on an optical data storage medium loaded, including a first data storage layer and a second data storage layer that are stacked in this order from the surface thereof toward the depth thereof, by radiating light through the surface toward the depth of the optical data storage medium, the drive comprising:

a light source for emitting the light;

a lens for producing a focal spot by converging the light that has been emitted from the light source; and a light detector, which includes at least one photodetector for receiving the light and generating a light quantity signal representing quantity of the light received, the at least one photodetector being used as a layer-sensing photodetector that is designed so as not to receive the light reflected from the second data storage layer when the focal spot is located on the first data storage layer and so as to receive the light reflected from the first data storage layer when the focal spot is located on the second data storage layer, wherein the controller receives the light quantity signal from the layer-sensing photodetector and determines, by the level of the light quantity signal, where the focal spot is now located, on the first data storage layer, on the second data storage layer, or in the vicinity thereof.

* * * * *